US012636704B2

(12) United States Patent
Li et al.

(10) Patent No.: US 12,636,704 B2
(45) Date of Patent: May 26, 2026

(54) CONFORMAL PRINTING DEVICE FOR CURVED-SURFACE CIRCUITS

(71) Applicant: XI'AN UNIVERSITY OF TECHNOLOGY, Xi'an (CN)

(72) Inventors: Shujuan Li, Xi'an (CN); Wang Qin, Xi'an (CN); Dajing Gao, Xi'an (CN); Zhiyuan Zhao, Xi'an (CN); Yong Liu, Xi'an (CN); Yixiao Yan, Xi'an (CN); Mingkun Wang, Xi'an (CN)

(73) Assignee: XI'AN UNIVERSITY OF TECHNOLOGY, Xi'an (CN)

( * ) Notice: Subject to any disclaimer, the term of this patent is extended or adjusted under 35 U.S.C. 154(b) by 79 days.

(21) Appl. No.: 18/788,735

(22) Filed: Jul. 30, 2024

(65) Prior Publication Data

US 2025/0041944 A1    Feb. 6, 2025

(30) Foreign Application Priority Data

Jul. 31, 2023    (CN) .......................... 202310952437.4
Nov. 14, 2023    (CN) .......................... 202311519442.2

(51) Int. Cl.
*B22F 12/53*        (2021.01)
*B22F 10/10*        (2021.01)
(Continued)

(52) U.S. Cl.
CPC .............. *B22F 12/53* (2021.01); *B22F 10/10* (2021.01); *B22F 12/90* (2021.01); *B33Y 30/00* (2014.12); *B33Y 50/02* (2014.12)

(58) Field of Classification Search
CPC .......... B22F 12/53; B22F 10/10; B22F 12/90; B22F 1/0545; B33Y 30/00; B33Y 50/02
See application file for complete search history.

(56) References Cited

U.S. PATENT DOCUMENTS 6,534,745 B1 *    3/2003    Lowney ................. B23K 26/32
                                                    219/121.84
7,358,457 B2 *    4/2008    Peng ....................... B22F 12/53
                                                    219/121.84
(Continued)

FOREIGN PATENT DOCUMENTS

CN        103147138 A        6/2013
CN        103753956 A        4/2014
(Continued)

OTHER PUBLICATIONS

First Office Action dated Jul. 30, 2025 received in Japanese Patent Application No. 202311519442.2.
(Continued)

*Primary Examiner* — Nahida Sultana
(74) *Attorney, Agent, or Firm* — Scully, Scott, Murphy & Presser, P.C.

(57) ABSTRACT

A conformal printing device for curved-surface circuits is provided. The device includes a device body that includes a stand and a support plate movable relative to the stand. The device further includes a print-head module mounted on the support plate and a motion module mounted on the device body. The print-head module includes a piezoelectric nozzle and an airflow assisting structure for applying an assisted airflow to guide charged jet ejected from the nozzle to be precisely printed onto a curved-surface base material below the nozzle. The motion module enables a tangent of a surface, on which a printing position of the curved-surface base material to be printed is located, to be always perpendicular to a jet ejected by the nozzle, ensures that the print-head module moves following the curved-surface shape, and implements conformal printing circuits on any complex curved surfaces.

12 Claims, 9 Drawing Sheets

(51) Int. Cl.
    *B22F 12/90*         (2021.01)
    *B33Y 30/00*         (2015.01)
    *B33Y 50/02*         (2015.01)

(56)           References Cited

U.S. PATENT DOCUMENTS

| | | | |
|---|---|---|---|
| 10,730,239 B1 * | 8/2020 | Glukhoy | B29C 64/245 |
| 2009/0057278 A1 * | 3/2009 | Nowotny | B23K 35/0244 |
| | | | 219/121.63 |
| 2011/0089151 A1 * | 4/2011 | Miyagi | B23K 26/34 |
| | | | 219/121.6 |
| 2017/0173879 A1 * | 6/2017 | Myerberg | B22F 12/53 |
| 2017/0252820 A1 * | 9/2017 | Myerberg | B22F 12/10 |
| 2019/0047088 A1 * | 2/2019 | Riemann | B22F 12/53 |
| 2021/0008880 A1 | 1/2021 | Tse et al. | |
| 2023/0146881 A1 | 5/2023 | Kingsley et al. | |

FOREIGN PATENT DOCUMENTS

| | | | | |
|---|---|---|---|---|
| CN | 104553422 A | | 4/2015 | |
| CN | 106626767 A | * | 5/2017 | B41J 2/01 |
| CN | 107512083 A | | 12/2017 | |
| CN | 108162595 A | | 6/2018 | |
| CN | 108538755 A | * | 9/2018 | B29C 64/245 |
| CN | 108859098 A | | 11/2018 | |
| CN | 109243982 A | | 1/2019 | |
| CN | 109366976 A | | 2/2019 | |
| CN | 110509394 A | * | 11/2019 | B28B 1/001 |
| CN | 113478973 A | | 10/2021 | |
| CN | 114604014 A | | 6/2022 | |
| CN | 116277928 A | | 6/2023 | |
| JP | 2002331259 A | | 11/2002 | |

OTHER PUBLICATIONS

First Office Action dated Jun. 25, 2025 received in Japanese Patent Application No. 202310952437.4.
Chinese Search Report dated Feb. 28, 2026 received in Chinese Application No. 2023115194422.
Chinese Office Action dated Feb. 28, 2026 received in Chinese Application No. 202311519442.2.

\* cited by examiner

CONFORMAL PRINTING DEVICE FOR CURVED-SURFACE CIRCUITS

CROSS-REFERENCE TO RELATED APPLICATION APPLICATIONS

This application claims priority to Chinese Patent Application No. 202310952437.4 filed on Jul. 31, 2023 and Chinese Patent Application No. 202311519442.2 filed on Nov. 24, 2023, the entire contents of each of which are incorporated herein by reference for all purposes.

FIELD

The present disclosure relates to the field of electro-hydro-dynamic inkjet printing technology, and in particular, relates to a conformal printing device for curved-surface circuits.

BACKGROUND

Three-dimensional curved-surface electronic product is a trend in microelectronics industry, a circuit directly molded on the surface of product structure may not only realize the integration of structure and function, but also make electronic products more miniaturized, intelligent and light-weight. Curved-surface conformal circuit not only has a unique ability to conformal coexist with complex curved-surface, but also retains electronic functions of planar integrated circuit, it has great significance for functional integration of, such as, health monitoring, environmental awareness, frequency selection surface, and the like, if it makes electronic devices with such circuit more widely be used in complex and changeable scenes, for example, scenes of aircraft intelligent sensing skin, stealth electromagnetic function structure, curved conformal antenna or the like.

At present, manufacturing technology of curved-surface circuit can be roughly divided into three types: extrusion 3D printing, laser direct writing and inkjet printing. The extrusion 3D printing technology is simple in principle, economical and has a wide range for material viscosities, but printing speed is slow, resolution is poor and it is unable to directly print circuits on a curved surface with a large curvature. The laser direct writing may complete etching manufacture of the circuit by modifying a base material, but the process has requirements for the base material, it has a narrow application range and it is not conducive to environmental protection. The inkjet printing is a green additive manufacturing technology, which can directly deposit functional ink onto the substrate to build images, which has advantages of material saving, environmental friendliness and simple operation, and has been widely used in recent years. However, an existing commonly used inkjet printing technology is a piezoelectric inkjet printing technology, which has some disadvantages of, such as, difficult to improve the printing resolution (a highest resolution is 20 μm in an ideal limit state), limited using range of ink viscosity (a highest ink viscosity is 20 mPa·s in an ideal limit state), size of ink droplet limited by nozzle diameter (diameter of ink droplet≈nozzle diameter×2), easy nozzle blockage and complicated nozzle manufacturing process.

SUMMARY

With respect to the above defects of the prior art or the needs for improvements, the present disclosure provides a directly conformal printing device for curved-surface circuits with high-resolution. An airflow-assisted electro-inkjet printing system realizes a directly conformal printing of electro-fluid on any complex curved-surface through a multi-axis linkage system, which breaks through a limitation of a non-planar substrate on the uniformity of the applied electric field, and solves a problem of an interference caused by a curved-surface electric field on jet of the electro-fluid inkjet printing. By building-in an electrode ring to integrate the electrode ring in the print-head module, a voltage between the electrode ring and the insulated substrate is significantly reduced, and a problem of an insulation substrate polarization influencing the printing is solved. By installing electrode rings with different thicknesses, the distance between the electrode rings and the nozzle can be adjusted, which is easy to operate. By applying an assisted airflow between the print nozzle and the electrode ring, a movement direction of the jet ejected from the nozzle is changed by the airflow, which not only may guide a precise positioning for the jet, but also constrain the airflow, breaking through a limitations of the limited distance between the print-head and the substrate, and improving the precision of the electro-fluid inkjet printing. Through an air-focused flow, it can more widely print materials that are insensitive to the electric field, and break through a limitation of the printed material by its own electrical conductivity, and widen an application range of the printed material. Through an electro-fluid printing assisted by an manner of air focusing, it may eject a fluid with higher Reynolds number, thereby getting rid of the strong dependence of the size of ink droplet or jet on the flow speed, and improving an ejecting efficiency. Through a gas buffer chamber and a conical airflow channel, it achieves buffering and focusing of the airflow, thereby improving the printing quality. The nozzle is treatment with a hydrophobic coating, which can prevent liquid from wetting an edge of the nozzle and ensure that a repeatable conical substrate is used for t for repeatable conical jet transitions. By using the assisted airflow to focus the liquid flowed out from the nozzle, the liquid forms a cone at the tip of the nozzle (i.e., at the small hole), which is similar to the shape of the Taylor's cone produced in electro-fluid inkjet printing. High-resolution air-focused assisting electro-fluid inkjet printing system can achieve printing with nanometer scale resolution, the diameter of the liquid jet may be up to 0.02~0.1 times the diameter of the nozzle, a minimum line width may be up to 10 nm, or even smaller. It has a strong compatibility for ink, suitable for ink with viscosity of 1~10,000 cP, and can even eject a fluid with a higher Reynolds number, thereby getting rid of a strong dependence of the size of droplets or jet on the flow speed, improving the ejecting efficiency. In addition, among an observation camera and a positioning camera in a vision system, the observation camera may be used to observe various forms of the electro-fluid inkjet printing jets in real-time visually during the printing process by directing to the nozzle, which can timely control the printing process to print at best process parameters. The positioning camera directs to the curved-surface base material, which is used to achieve real-time accurate positioning between the curved-surface base material and the nozzle, and through an adjustment from a feedback system, the printing quality is improved. A curing and molding module may achieve a simultaneously curing and conductive processing for the inkjet printed circuit by using of a high-energy thermal effect of laser sintering, facilitating a direct printing of curved-surface multi-layer circuits of heterogeneous multi-materials.

In order to achieve above purposes, the present disclosure provides a conformal printing device for curved-surface circuit, which includes a print-head module and an airflow assisting structure thereof, a five-axis motion module, a vision module and a curing and molding module, specifically:

The print-head module includes a print-head portion, the print-head portion includes a nozzle and an airflow assisting portion and an electrical signal portion relating to the nozzle, specifically includes an ink tank, a nozzle and an electrode ring. The print-head portion is mounted on top of the Z-axis substrate, and the Z-axis substrate drives the print-head portion to move up and down vertically to realize a degree of freedom in the Z-axis direction, the Z-axis substrate is mounted on a vertical support column, and a substrate is mounted on a support plate connecting the Z-axis, the print-head portion is mounted the substrate, the substrate is moved up and down along with the Z-axis movement assembly to realize a degree of freedom in the Z-axis direction for the print-heat, the nozzle is disposed below the ink tank, and by controlling the air pressure in a pneumatic valve, a pneumatic ink supplying is realized with a high-frequency stable ink supplying. The airflow assisting structure is integrated with the nozzle at outside of the nozzle, and forms an axisymmetric structure about the central axis of the nozzle. The airflow assisting structure comprises a conical chamber, a gas buffer chamber and a gas tube, which are coaxially integrated below the nozzle. A bottom end of the nozzle is positioned above the bottom end of the airflow assisting structure and spaced apart by a fixed distance. There is an air inlet at side surface of the gas buffer chamber, and the air inlet is connected to a pressurized air source, a gas of the gas source is homogenized by the annular buffer chamber, and then converged into the gas tube. The gas tube is coaxially mounted outside of the nozzle, and there is an air outlet at the bottom end of the gas tube coaxially with the nozzle. The airflow flows in from a circular ring region between the nozzle and the gas tube, and finally focuses on the jet, which gathers at the air outlet below the nozzle, and jets of the airflow and electro-fluid are ejected via this small hole, and the electrode ring is disposed at the lowermost end of the airflow assisting structure. The electrical signal portion includes a high-voltage power supply and a high-voltage amplifier, wherein the high-voltage power supply and the high-voltage amplifier are used to apply a voltage to the ink in the ink tank and to the electrode ring, the nozzle is connected to a positive high-voltage, the electrode ring is connected to a positive low-voltage, and the substrate is connected to a negative high-voltage.

The five-axis motion module comprises three translational axes X, Y, and Z and two rotating axes B and C, wherein the B and C axes rotate around the directions of the Y and Z axes, respectively. A vertical support column is included, a Z motion axis group is provided in the support column, a support plate is arranged on two Z motion axis groups, a connecting substrate is arranged on the support plate, the print-head is mounted on the connecting substrate, and the print-head makes a Z-direction translational movement along with the connecting substrate; a worktable is provided directly under the print-head, and the worktable is mounted on a two-dimensional rotating table, a first rotating part rotates around the Y axis (B direction rotation), and the second rotating part is mounted on the table surface of the first rotating part, and the second rotating part rotates around a normal direction perpendicular to the plane of the first rotating part (C direction rotation); the two-dimensional rotating table is mounted on the Y motion axis group, and the Y motion axis group is mounted on a X motion axis group through a slide table, and the two-dimensional rotating table as a whole moves along with the X and Y motion axis groups for the X-direction and Y-direction translational movement at the same time. Through a relative motion of the worktable and the print-head, the three translational movements of X, Y, Z and the two rotating movements of B and C are realized, and a conformal motion of the print-head and the complex curved-surface is realized through the five-axis linkage, and the nozzle can reach any position on the curved surface of an entity to be printed and maintain a reasonable printing distance, so as to realize a basic motion requirements for three-dimensional stereoscopic printing, and to ensure that the uniformity of the applied electric field on the print-head.

The vision module includes an observation camera and a positioning camera. The observation camera directs to the nozzle for real-time observing the Taylor's cone of the electro-fluid inkjet printing jet in the printing process, and the positioning camera directs to the curved surface for real-time accurate positioning between the curved-surface base material and the nozzle.

The curing and molding module mainly comprises a laser sintering part, and a high heat generated by the laser sintering part rapidly may cure the ink while making it electrically conductive, thereby effectively preventing the effect of high temperature on the curved-surface base material.

The present disclosure also adopts the following preferred solutions:

The nozzle is coaxially disposed above the air outlet, the distance between the nozzle and the air outlet is kept fixed, and a pressure difference of the air on both sides of the air outlet forms a sharply contracted airflow, which focuses the liquid flowing out of the nozzle, to be formed between the air outlet and the nozzle.

A gas tube is coaxially mounted in an airflow-assisted electro-fluid nozzle formed outside the solution nozzle, and an assisted airflow is uniformly and stably passed between the gas tube and the nozzle. The airflow changes motion direction of the jet ejected from the nozzle, converges around the electro-fluid jet to restrict the jet, and guides the jet to accurately print onto the curved-surface base material located below the nozzle and the electrode ring.

The airflow flows in from the circular region between the nozzle and the gas tube, converges at the air outlet of the gas tube below the nozzle and has a high speed. As the airflow develops, the speed of airflow decreases after the airflow contacts the base material and spreads around, eventually sinking into the surrounding environment.

In a dual manufacturing process of airflow and electro-fluid, if only an electro-hydro-dynamics (EHD) method is adopted, the switch is turned on, and compressed air is not allowed to enter the chamber. A strong electric field is formed between the nozzle and the base material, and the liquid can only be pumped from the nozzle by electricity; or, if only the airflow focusing ejecting method is adopted, the switch is turned off to remove the electric field in the chamber, and the compressed air enters the ink chamber, forcing the ink chamber to form a pointed cone similar to Taylor's cone, and then the liquid jet is ejected from the air outlet with the flowing air.

The electrode ring is coaxial with the nozzle and is used to reduce the voltage between the electrode ring and the worktable, thereby reducing the impact of base material polarization on the printing effect; the electrode ring is also used to focus the jet to achieve an effect of suppressing satellite ink droplets.

When the worktable is grounded, the potential of the curved-surface base material to be inkjet-printed is zero, and the voltage applied in the ink is higher than the voltage applied in the electrode ring, thereby forming a gradient potential difference among the ink, the electrode ring and the object to be inkjet-printed, thus ensuring the stability of the electric field during an attitude change of the curved-surface base material to be inkjet-printed, and the liquid is accurately ejected to the curved-surface base material from the cone tip.

A high-voltage power supply is used to generate positive and negative alternating voltages, and the voltage signal is amplified 1,000 times by a high-voltage amplifier to be loaded between the nozzle and the base material to achieve a high-voltage range required for electro-inkjet printing. Different electrical signals can make the nozzle generate different forms of electro-fluid inkjet printing jets.

The precision print-head includes a matching high-precision pressure balancing system and electrical control circuit, and the balancing system is used to realize an ink-supplied driving of nano-silver conductive solution.

The electrical signal portion further includes a flow supply module for adjusting the flow of ink ejected from the nozzle.

The high-voltage power supply and high-voltage amplifier provide a positive and negative alternating electric field for printing, and the print-head is connected to the positive and negative alternating AC voltage signal, so that the charge of the ink droplets printed on the insulating substrate is also positive and negative alternating, thereby neutralizing the charge of the ink droplets to reduce the impact of the charge on the jet, so as to solve a problem of printing instability due to charge accumulation effect on any insulating substrate.

The flow supply module is driven by an air pressure balance system. The balance system has an automatic compensation function that can automatically adjust the air pressure according to the amount of ink in the ink tank, which is used to prevent a "needle climbing" phenomenon of ink caused by capillary effect, so as to realize quantitative and stable supply of materials during the entire printing process.

A central pneumatic compressor, as the compressed air source, is capable of delivering compressed air up to 125 psi, allowing a custom regulator setting with 2 psi resolution to control the compressed air delivered to the pressurized chamber.

In an airflow field at the print-head, the profile shape of the contracted part of the inner wall of the gas tube and the position of the air outlet relative to the tip of the nozzle are both key factors affecting the airflow field. The flow focusing micro-nozzle of the present disclosure is made by flame polishing. The surface of the glass gas tube is smooth, and the roughness of the surface of the small hole is less than the thickness of a surface boundary layer of the small hole, which is not only detrimental to the formation of turbulent flow and backflow, but also conducive to removing impurities and preventing the gas tube from clogging.

The nozzle is treated with hydrophobic coating, which can prevent the liquid from wetting the edge of the nozzle, and ensure that a repeatable conical substrate is used for repeatable conical jet transitions.

Airflow focusing may be used to eject insulating materials that are insensitive to electrical property, and electro-hydrodynamic inkjet printing may be used to eject conductive ink materials that are sensitive to electrical property. Through multi-print-head linkage, a direct synchronous printing of heterogeneous multi-materials can be realized. Conductive layers and insulating layers are alternately stacked, conductive layers are used to transmit current and signal, and insulating layers are used to insulate and protect conductive layers.

Generally speaking, by comparing the above technical solution proposed by the present disclosure with the prior art, the following beneficial effects can be achieved:

1. The present disclosure can effectively solve a technical difficulty that the high-precision circuit cannot be directly manufactured on the non-planar substrate in the current printed electronics field, and can realize a automation, precision, environmental protection and high-efficiency direct manufacturing for any complex curved-surface conformal circuit without other additional auxiliary processes such as transfer and deformation.

2. The present disclosure uses an air assisting method as a complementary method to solve the inherent limitations of electro-fluid printing, and is a dual manufacturing process that combines two methods. When the printing material is a conductive ink sensitive to an electric field, the airflow is applied as an auxiliary process co-current onto the electrical fluid jet; when the printing material is a material that is insensitive to electric field, the airflow focused ejection is used as a main process to complete a focused ejection of ink droplets.

3. The present disclosure can directly and conformably manufacture a curved-surface circuit on the surface of products with any complex shapes, breaks through a limitation of printing conditions and resolution in the traditional printing process, solves a problem that the high viscosity liquid is easy to block the nozzle, and has advantages of simple process, high resolution, high efficiency, high reliability and low cost, which may meet a flexibility requirement of the direct manufacture of the any curved-surface conformal circuit.

4. The airflow assisting focused electro-fluid printing of the present disclosure eliminates the limitation of the material and shape of the substrate on printing in the electro-fluid inkjet printing, realizes an accurate and stable printing of the electro-fluid printing on the insulating and non-planar substrates, and greatly broadens the application range of the electro-fluid printing.

5. The present disclosure addresses an inherent limitation of electro-fluid printing by using the airflow assisting method as a complementary method, and proposes a dual manufacturing process that combines the two methods. When the ink is a material sensitive to the electric field, an electro-fluid inkjet printing method assisted with airflow is used. Compressed air is allowed to enter the chamber, the nozzle is energized with a high positive voltage, the electrode ring is energized with a low positive voltage, and the worktable is grounded. A strong electric field is formed between the nozzle and the worktable, and a liquid is withdrawn from the nozzle through the electric power assisted by the airflow field. When the ink is a material that is not sensitive to the electric field, an airflow focusing ejecting method is used, and a switch is closed to remove the electric field between the nozzle and the worktable. The worktable does not need to be grounded, while the substrate may be any curved-surface substrate or non-curved-surface substrate made of insulating material. The pressurized air enters the chamber, forcing the ink chamber to form a pointed cone similar to a Taylor's cone, and then a liquid jet is ejected from the air outlet accompanied by the flowing air.

6. The present disclosure adds an electrode ring coaxial with the nozzle between the nozzle and the base material, and the nozzle and electrode ring are controlled by a multi-stage voltage. The voltage of the electrode ring is lower than that of the nozzle, so that a gradient potential difference is generated between the nozzle and the electrode ring and between the electrode ring and the curved-surface base material to be printed. In this way, the voltage between the electrode ring and the base material can be significantly reduced, reducing the effect of base material polarization on printing.

7. The airflow assisting structure of the present disclosure is made of an insulating material. The electrode ring is made of a conductive material, and the thickness of the electrode ring is 0.5 mm to 3 mm. An axial distance between the nozzle and the electrode ring, i.e., a distance along a direction of a center axis of the print-head, is adjusted by mounting the electrode rings with different thicknesses, and the axial distance thereof can be adjusted in the range of 0 mm to 3 mm.

8. In the present disclosure, through applying a high voltage to the conductive ink by using high-voltage power supply and high-voltage amplifier, applying a low voltage to the electrode ring, and grounding the worktable to make the potential on the curved-surface base material to be printed be zero, thereby forming a stable electric field that does not change with the attitude movement of the curved-surface base material to be printed, so as to enable the conductive ink at the nozzle to be smoothly ejected out, to form a continuous jetting, to have a high ejecting precision, and a good molding effect.

9. The electric field formed between the nozzle and the electrode ring in the present disclosure has a radial component pointing toward the electrode ring, and an assisted airflow is applied between the printing nozzle and the electrode ring, and the co-current airflow produces a continuous micro-jet. The airflow changes a moving direction of the jet ejected from the nozzle, which can avoid the ejected charged jet being printed to the electrode ring, and guide the jet to print to the base material located below the printing nozzle and the electrode ring. With this method, a restriction that the base material must be grounded is lifted, an influence of the relative height change of the base material on the electric field strength at the nozzle tip is greatly reduced, and printing on a curved-surface insulating base material is realized.

10. The present disclosure applies an assisted airflow between the printing nozzle and the grounded electrode, and the airflow changes the moving direction of the jet ejected from the nozzle, to guide the jet to precisely print on the base material located below the printing nozzle and the electrode ring, thereby eliminating the dependence of the printing behavior on a levelness of the base material and the distance between the nozzle tip and the electrode ring.

11. The present disclosure utilizes airflow-assisted electro-fluid inkjet printing to prepare curved-surface conformal circuits, which reduces the manufacturing cost, expands the application range of printable materials, and improves the inkjet printing accuracy. The present disclosure adopts a five-degree-of-freedom motion platform, which may ensures that the normal line of the curved surface to be inkjet printed is coincident with the ejecting direction of the nozzle at all times, and may provide a stable electro-fluid inkjet printing process environment by supplementing the efficacy of the electrode ring and the matching of the parameter thereof, to ensure a stable formation and maintenance of a "Taylor's cone" in the electro-fluid inkjet printing process. According to the inkjet printing method of the present disclosure, it may realize a conformal patterning process for any complex curved-surface, and through a direct printing and preparing high-quality circuits and devices with high straightness, good uniformity, strong continuity and excellent electrical performance, it breaks through a technical bottleneck that high-precision conformal circuits cannot be directly manufactured on any complex curved surface (especially large curvature concave surface), breaks through a limitation that traditional preparation of curved-surface circuit is only limited to simple curved surface or plane with small curvature, and improves the application range of electro-fluid conformal inkjet printing process.

12. The present disclosure applies an assisted airflow between the printing nozzle and the grounded electrode, and when the ink is ejected, the airflow will flow through the channel to form an airflow casing. This airflow casing will enclose the ejected ink droplets to maintain them in a stable shape and speed. By controlling the flow of airflow, the position and shape of the ink jet can be precisely controlled, resulting in higher resolution and higher quality printing effect.

13. The airflow-assisted electro-fluid ejecting of the present disclosure may accelerate a speed of the ink ejection, which breaks through a strong dependence of the size of the ink droplet or jet on the flow speed, that's because the low Reynolds number is constrained by a requirement that the total flow speed cannot increase beyond a threshold, and the medium-to-high Reynolds number airflow focusing method opens up a new perspective for a high productivity complement of the low-Reynolds number electro-fluid inkjet printing system. By generating a continuous micro-jet stream through the co-current airflow, ink can be deposited at higher production rates and its printability is not limited by ink viscosity.

14. The present disclosure aims at the problem that, when printing on a curved-surface insulating substrate, electro-fluid inkjet printing jet often fails to be generated or the jet is disordered due to a polarization of a strong electric field By improving the printing-head of the curved-surface electro-fluid inkjet printing, an alternating current (AC) amplifier and a pulse function generator are configured, and the airflow and positive and negative alternating electric fields are supplemented, so that the electro-fluid printing process can directly print a high-precision conformal circuit on any base material according to demand, ensuring that the shape of the deposited droplets and trajectory of the jet are not affected by the base material.

15. The airflow assisted electro-fluid inkjet printing of the present disclosure may also print on a variety of different types of media, such as ordinary paper, photo paper, fabric and so on.

16. In addition to print conductive materials, the airflow assisted electro-fluid ejecting system of the present disclosure may also print non-conductive materials that are not sensitive to electric fields. The nozzle is coaxially disposed above a small hole, and a pressure difference between the air on both sides of the small hole makes it possible to form a sharply contracted airflow between the small hole and the nozzle. The airflow focuses the liquid, which is not sensitive to the electrical property, flowing out of the nozzle, so that the liquid forms a cone at the tip of the nozzle (i.e., at the small hole), which has a cone that is similar to the shape of a Taylor's cone produced in the electro-fluid inkjet printing, and the liquid passes through the small hole and then forms a micro-jet at the end of the cone.

17. The solution nozzle of the present disclosure is coaxially disposed over a small hole, and the pressure difference between the air on both sides of the small hole causes a sharply constricted airflow to form between the small hole and the nozzle. The airflow focus the liquid flowing out of the nozzle, causing the liquid to form a cone at the tip of the nozzle (i.e., at the small hole) that is similar in shape to the Taylor's cone produced in electro-fluid inkjet printing. After the liquid passes through the small hole, a fine jet forms at the end of the cone. With increasing disturbance, the jet breaks up into micro-droplets after passing a certain distance. The same as electro-fluid inkjet printing, the jet produced by focusing airflow has a size much smaller than that of the nozzle, and the size of the formed droplets are micro-nanometer scale.

18. The deposition behavior of the jet in electro-fluid inkjet printing is also affected by the surrounding flowing field, which inevitably produces jet adhesion, and thus applying airflow around the jet is a very important auxiliary way in electro-fluid inkjet printing process. The airflow assisted electro-fluid inkjet printing is to coaxially apply a stable airflow in the same direction as the jet between the outside of the nozzle and the gas tube. The auxiliary airflow provides external tensile force and restraint for the charged jet, the airflow converges around the electro-fluid jet to make it have better focusing and have a better restraint effect on the jet, and may overcome the interference of residual charge and high-speed moving substrate.

19. In the present disclosure, in the insulating non-planar substrate, through an airflow assisted electro-fluid inkjet printing compatible electro-fluid inkjet printing, an accurate and stable printing of three printing modes of electro-dot ejecting, electro-eject coating and electrostatic spinning is achieved.

20. The high heat generated by the laser sintering in the present disclosure may cure the ink rapidly, and at the same time make it have electrically conductive property, thereby preventing effectively high temperature from influencing the curved base material, and not affecting an adhesion of the nano-metallic ink on the substrate.

21. The airflow focusing of the present disclosure can be used to eject insulating materials that are not sensitive to electrical property, and electro-hydrodynamic inkjet printing can be used to eject conductive ink materials that are sensitive to electrical property. Through multi-nozzle linkage, a direct synchronous printing of heterogeneous multi-materials can be realized. Conductive layers and insulating layers are alternately stacked, conductive layers are used to transmit current and signal, and insulating layers are used to insulate and protect conductive layers.

22. The high-resolution air-focused assisted electro-fluid inkjet printing system of the present disclosure can realize a nanometer-scale resolution printing, the diameter of the liquid jet can be up to 0.02-0.1 times a diameter of the nozzle, and the minimum line width can be up to 10 nm, or even smaller; the ink is highly compatible, suitable for inks with a viscosity of 1 to 10,000 cP, and it can even eject higher Reynolds number of fluids, eliminating the strong dependence of sizes of droplets or jet on flow speed, and improving ejecting efficiency.

23. The present disclosure establishes a real-time monitoring system for the printing process, which can realize a monitoring of the form of jet in the whole process of printing, and through real-time observation of the liquid state at the end of the nozzle, parameters of the printing process can be timely adjusted, so as to print a high-quality and high-precision curved-surface circuits as required.

A LIST OF REFERENCE NUMBERS

Figure 1:
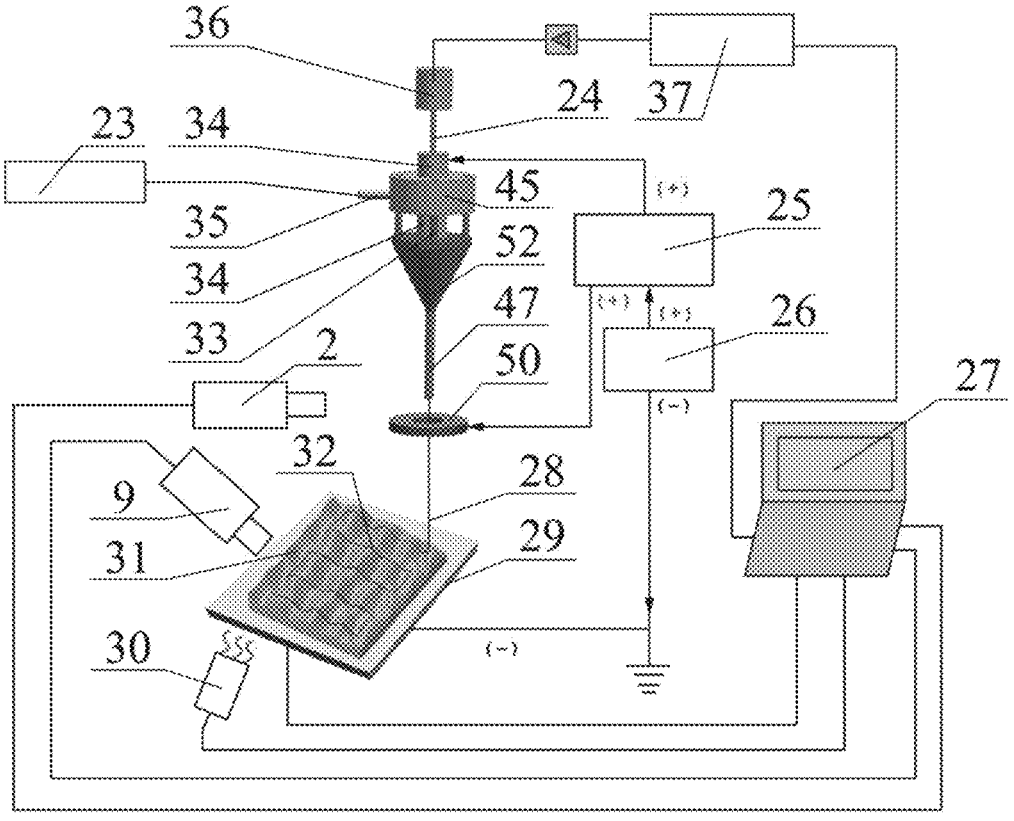
FIG. 1 is a principle schematic view of airflow-assisted electro-fluid conformal printing constructed in accordance with a preferred embodiment of the present disclosure.
Figure 2:
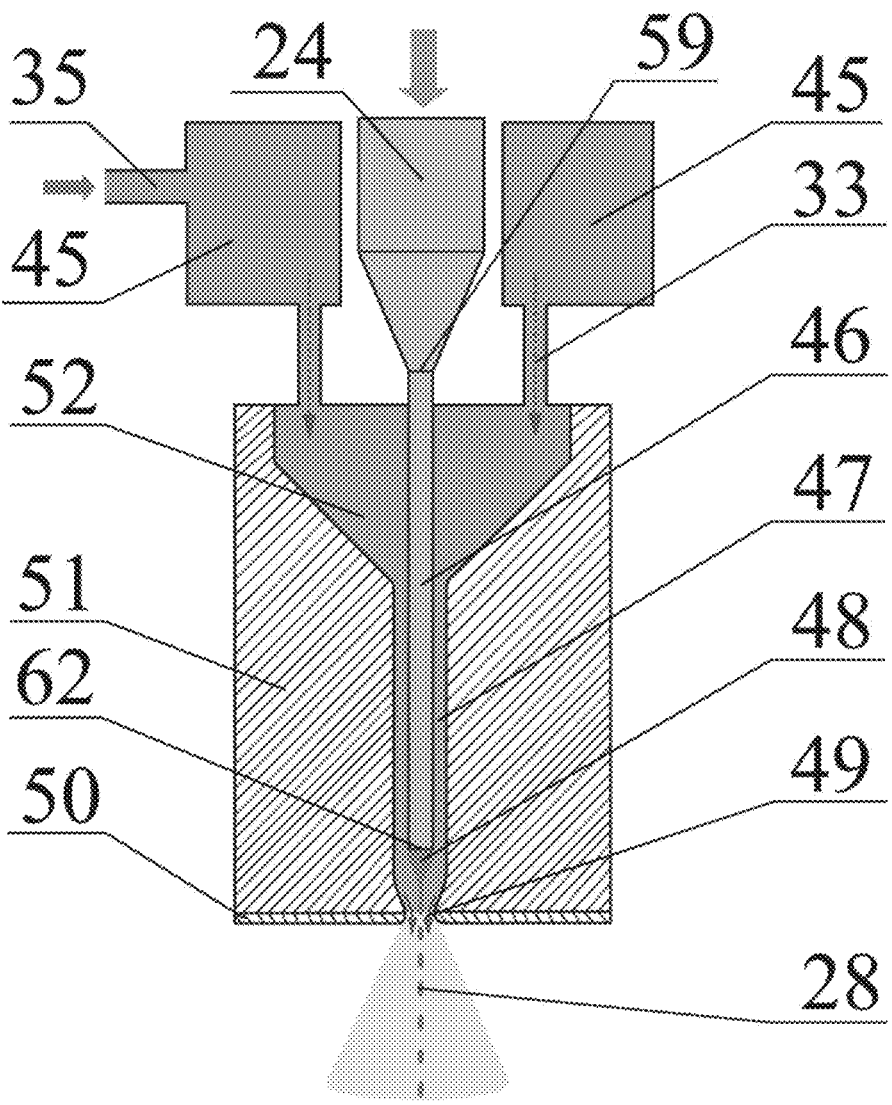
FIG. 2 is a principle schematic view of the airflow structure of an airflow-assisted electro-fluid conformal printing print-head constructed in accordance with a preferred embodiment of the present disclosure.

1—Z-axis drive motor; 2—observation camera; 3—support plate; 4—C-axis drive motor; 5—moving slide table; 6—first drive assembly; 7—X-axis drive motor; 8—print-head module; 9—positioning camera; 10—connecting substrate; 11—rib plate; 12—second rotating drive assembly; 13—B-axis drive motor; 14—second drive assembly; 15—first rotating drive assembly; 16—coupling; 17—X-axis drive screw; 18—two-dimensional rotating table; 19—Y-axis drive motor; 20—vertical support column; 21—Z-axis drive screw; 22—third drive assembly; 23—central pneumatic compressor; 24—liquid delivery tube; 25—high-voltage amplifier; 26—high-voltage power supply; 27—upper computer; 28—jet; 29—worktable; 30—laser sintering part; 31—curved-surface base material; 32—printing pattern; 33—peripheral connector; 34—intermediate connector; 35—air inlet; 36—ink tank; 37—flow pump; 38—conductive ink print-head; 39—insulating ink print-head; 40—ink droplet; 41—second conductive layer; 42—second insulating layer; 43—first conductive layer; 44—first insulating layer; 45—gas buffer chamber; 46—nozzle; 47—gas tube; 48—Taylor's cone; 49—air outlet; 50—electrode ring; 51—structure body; 52—conical chamber; 53—Z-axis direction; 54—C-rotational movement; 55—Y-axis direction; 56—X-axis direction; 57—B-rotational movement; 58—chip mount area; 59—nozzle inlet; 60—metal protective housing; 61—piezoelectric material; 62—nozzle outlet; 63—ink chamber; 64—capillary glass tube.

DETAILED DESCRIPTION

In order to make the purposes, technical method and advantages of the present disclosure clear, the technical method of the present disclosure will be clearly and completely described in combination with specific embodiments and corresponding drawings of the present disclosure. Obviously, the embodiments described are only some embodiments of the present disclosure and not all embodiments. Based on the embodiments of the present disclosure, all other embodiments obtained without creative effort by those skilled in the art fall within the scope of protection of the present disclosure.

Electro-fluid-dynamic inkjet printing is a new type of inkjet printing method, which has sub-micron resolution and wide-range ink viscosity compatibility, and provides a good solution for high-resolution deposition of high-viscosity materials.

Different from the traditional inkjet printing method of "squeezing", electro-fluid inkjet printing is driven by an electric field to produce a very fine jet from cone tip of the formed "Taylor's Cone" by the way of "pull", which has the advantages of easy ejection of particles or polymer solution without blockage, and printing conductive liquid with high viscosity (≤10,000 mPa·s). The printing resolution of electro-fluid inkjet printing is not directly affected by the diameter of the nozzle, and it can realize sub-micron resolution (>0.3 μm) printing, which can be used in the fields of curved-surface electronic circuits, solar cells, bio-functional devices, and the like.

However, the existing electro-fluid inkjet printing method is not suitable for substrates with large curvature, and due to the influence of non-planar substrates on electric field and the charge accumulation and polarization problems of insulated substrates, the printing performance of electro-fluid inkjet printing on non-planar insulated substrates is poor. That's because the curved-surface electric field will interfere with the jet of electro-fluid inkjet printing, thereby affecting the printing quality. Specifically, when the print-head performs printing on curved-surfaces with different curvatures, because it is impossible to print by following the shape of curved surface, the direction of the jet is not vertically downward, but is "pulled" by the lateral electric field, which also produces two inevitable problems for printing: (1) Because the jet is "pulled" by the lateral electric field, the landing point of the jet is inconsistent with the actual movement track of the nozzle, which affects the positioning accuracy of printing; (2) The normal distance between the nozzle and the substrate will decrease, but the voltage between the nozzle and the substrate is fixed, which means that the field strength between the electrodes will increase, thereby leading to turbulence in the jet of electro-fluid inkjet printing. Therefore, when printing on a non-planar substrate, it is difficult to keep the relative vertical height between the nozzle and the substrate surface fixed, and the change of the relative vertical height will lead to a change of the electric field intensity at the nozzle tip, which is a key factor to control ink droplet ejection. After the curved-surface electric field distribution changes, the direction of the electric field between the nozzle and the substrate will deviate with the change of the surface of the substrate, thereby affecting the uniformity of the applied electric field. Moreover, the existing print-head has a limited range of variation in height from the non-planar substrate, and a slightly higher printing height will lead to a poor printing effect.

In electro-fluid inkjet printing, the jet for printing has a higher charge density, and the movement of the jet is mainly controlled by the electric field force. In the printing process, due to the low conductivity of the insulating material, the charge carried by the deposited ink droplets cannot be eliminated by the substrate, and the charge accumulation and polarization problems of the insulating substrate and the irregular surface of the curved-surface substrate all affect the electric field at the nozzle. Charge accumulation and substrate polarization will affect the electric field around the nozzle, or has a reject function to the ink droplets to be printed later, which will reduce the stability and accuracy of electro-fluid inkjet printing, and even lead to the inability of completing printing. Therefore, the existing inkjet printing method cannot form a stable electric field, and cannot meet the requirements of uniformity and stability of conformal printing of curved-surface circuit. It is the key of improving the printing performance to ensure the stability of the electric field distribution and the force of the charged inkjet in the electro-fluid inkjet printing space.

In addition, the printing efficiency of electro-fluid inkjet printing hinders its application in a wide range of rapid prototyping fields, mainly because the size of ink droplets or inkjets shows a strong dependence on the flow speed. The low Reynolds number is constrained by the requirement that the total flow speed does not increase beyond the threshold, to ensure that the inertial force remains negligible. Furthermore, due to the limited property of electro-fluid itself, it is difficult to print some materials insensitive to electric field at a given target ink droplet size, for example, insulating materials between multilayer circuits.

To sum up, the existing problems of electro-fluid inkjet printing, such as inability of directly inkjet printing on insulated substrate, inability of inkjet printing on complex curved surface according to the shape thereof, low printing efficiency and inability of printing materials insensitive to electric field, have been reduced the printing accuracy and stability, and even led to complete inability of printing, which has seriously limited the application range of electro-fluid inkjet printing. Therefore, in view of the urgent demand of curved-surface functional electronic devices for conformal inkjet printing, it is of great significance to design a high-precision electro-fluid conformal printing system for any complex curved surfaces to solve the above problems.

According to the a directly conformal printing device with high-resolution for curved-surface circuits provided by the present disclosure, through the high-precision five-axis linkage system, it realizes the high-resolution conformal inkjet printing movement of the electro-fluid on any complex curved surface, breaks through the limitation of the non-planar substrate shape on the uniformity of the applied electric field, and solves the problem of the curved-surface electric field interfering with jet of the electro-fluid inkjet printing. The focus of assisted airflow breaks through the limitation of electro-fluid not being able to print materials that are not sensitive to electrical property, and broadens the application range of electro-fluid printable materials. Wherein, the inkjet printing system includes a print-head portion and an electrical signal portion. The print-head portion includes a piezoelectric nozzle, an electrode ring, and an airflow assisting structure, the airflow assisting structure and the electrode ring are integrated in the electro-fluid inkjet printing print-head, the nozzle is arranged coaxially with an gas tube, and an airflow is passed between the nozzle and the electrode ring. The electrical signal portion applies an alternating voltage to the ink in the ink tank and to the electrode ring, and the positive voltage applied to the nozzle is higher than that applied to the electrode ring. The substrate to be printed is grounded, and the ground potential of the substrate to be printed is zero. Through multi-stages voltage control, the nozzle and the substrate form a stable electric field required for electro-fluid inkjet printing therebetween, and charged ink is jet with high-resolution onto the insulating substrate by the nozzle under the action of the gas fluid and electric field force. The electrode ring significantly reduces the voltage between the electrode ring to the insulating substrate, and the alternating voltage solves a problem of influence of insulating substrate polarization to the electro-fluid printing. The assisted airflow may change the moving direction of the jet ejected from the nozzle, so as to guide the precise positioning of the jet and to constraints on the airflow, breaking through the limitations of the limited distance between the print-head and the substrate to improve the precision of electro-fluid printing. Pure electro-fluid printing cannot meet the printing of materials insensitive to electrical property, and through the focus of the assisted airflow, it can be more broadly printed on the material insensitive to the electric field, which breaks through the limitations of the material for printing by its own conductivity, broadens application range of the material for high-resolution printing, and can realize a direct printing of the heterogeneous multi-material and multi-layer curved-surface circuits. The multi-axis linkage precision mechanical movement structure can realize a direct conformal printing curved-surface circuit on any complex surface, and the process is simple, which can meet the using needs of military, civilian and consumer electronics. The high-resolution gas-focused auxiliary electro-fluid inkjet printing system can realize a printing in nano-level resolution, the diameter of the liquid jet may be up to 0.02~0.1 time of the diameter of the nozzle, the minimum line width may be up to 10 nm and the ink has a strong compatibility, which is suitable for ink with a viscosity of 1 to 10,000 cP, and even a fluid with higher Reynolds number can be jetted, thereby getting rid of the strong dependence of size of the ink droplet or jet on the flow speed, and improving the jetting efficiency. The vision system includes an observation camera and a positioning camera. The positioning camera is used for real-time accurate positioning between the curved-surface substrate and the nozzle, and the observation camera is used for real-time visual observation of the various morphologies of the electro-fluid inkjet printing jet during the printing process, which enables timely adjust the printing process to the best process parameters for inkjet printing. The curing molding system utilizes the high-energy thermal effect of laser sintering to achieve simultaneous curing and conductive processing of the printed circuit. The present disclosure realizes a high-precision airflow-assisted electro-fluid conformal inkjet printing process, which can be used to directly fabricate high-precision, high-efficiency and low-cost batch curved-surface circuits in batch on complex surfaces of any product structure, and improve the application range and flexibility of the electro-fluid inkjet printing process. As a breakthrough curved-surface circuit manufacturing process, the curved-surface conformal process of the present disclosure has an important practical significance in energy saving and emission reduction, and realizing "carbon neutrality", and even more significant strategic significance in the military and civilian fields, especially in warplane, rockets, missiles and other military aircraft, which will directly bring the subversive effects, such as effective weight reduction, reduction of the occupation of space, and improvement of the performance and reliability, and the like.

1. Inkjet Printing System

The structure of the inkjet printing system of the high-precision airflow-assisted electro-fluid conformal printing device is different from that of an ordinary electro-fluid printing device. Ordinary electro-fluid printing device, due to the limitations of the nature of the electro-fluid printing itself, is very difficult to print the materials insensitive to the electric field, such as the insulating materials between multilayered circuits, with the given target ink droplet size. Moreover, due to the existing electro-fluid inkjet printing has problems such as the inability of directly inkjet printing on an insulating substrate, the inability of conformal printing on a complex curved surface, and the low printing efficiency, which seriously limits the application range of the electro-fluid inkjet printing technology. The inkjet printing system of the present disclosure includes a print-head module 8 comprising a plurality of print-heads, each of which includes a nozzle 46, an airflow assisting structure and an electrical signal supplying portion. The airflow assisting structure and the nozzle 46 are integrated with each other, and the electrical signal supplying portion is used to provide driving electrical signals required for electro-fluid printing to the nozzle 46.

As shown in FIGS. 1, 2, 3 and 5, the print-head module 8 as a whole is disposed below the support plate 3, each print-head comprises an ink tank 36 for storing an ink solution to be inkjet-printed, a nozzle 46 disposed below the ink tank 36 and connected thereto via a liquid delivery tube 24, and an assisting electrode ring 50 coaxial disposed below the nozzle 46.

Figure 3:
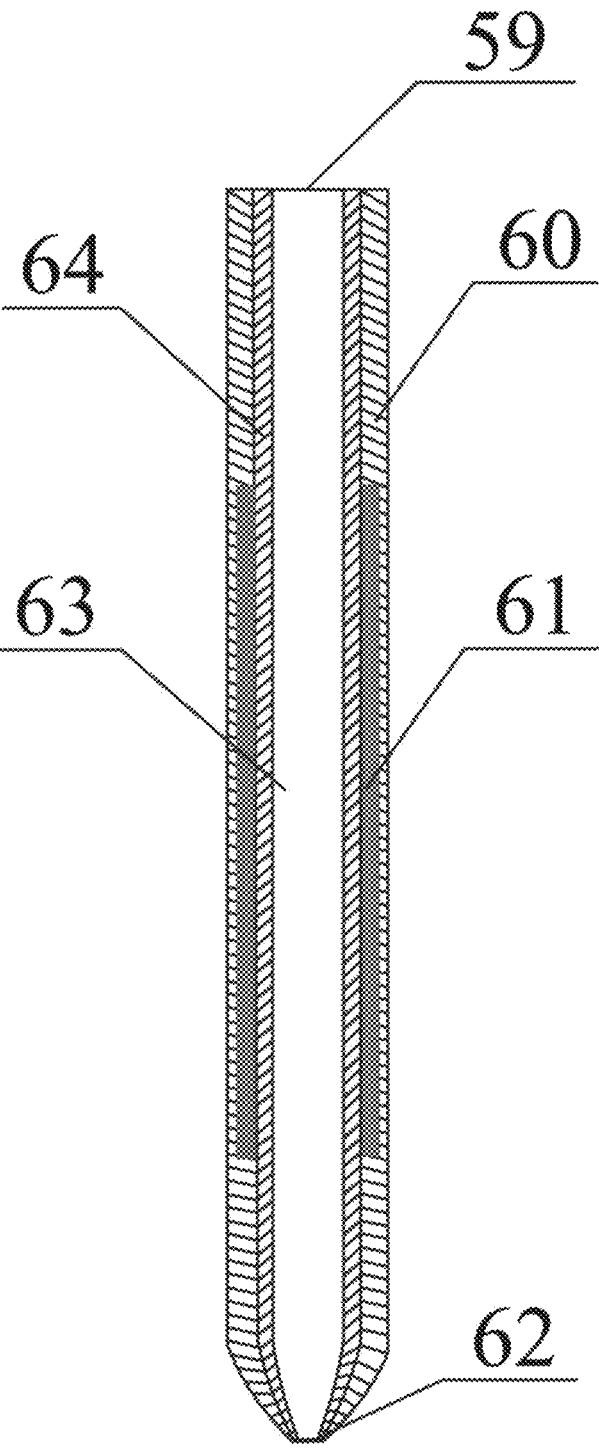
FIG. 3 is a principle schematic view of a structure of a nozzle constructed in accordance with a preferred embodiment of the present disclosure.
Figure 4:
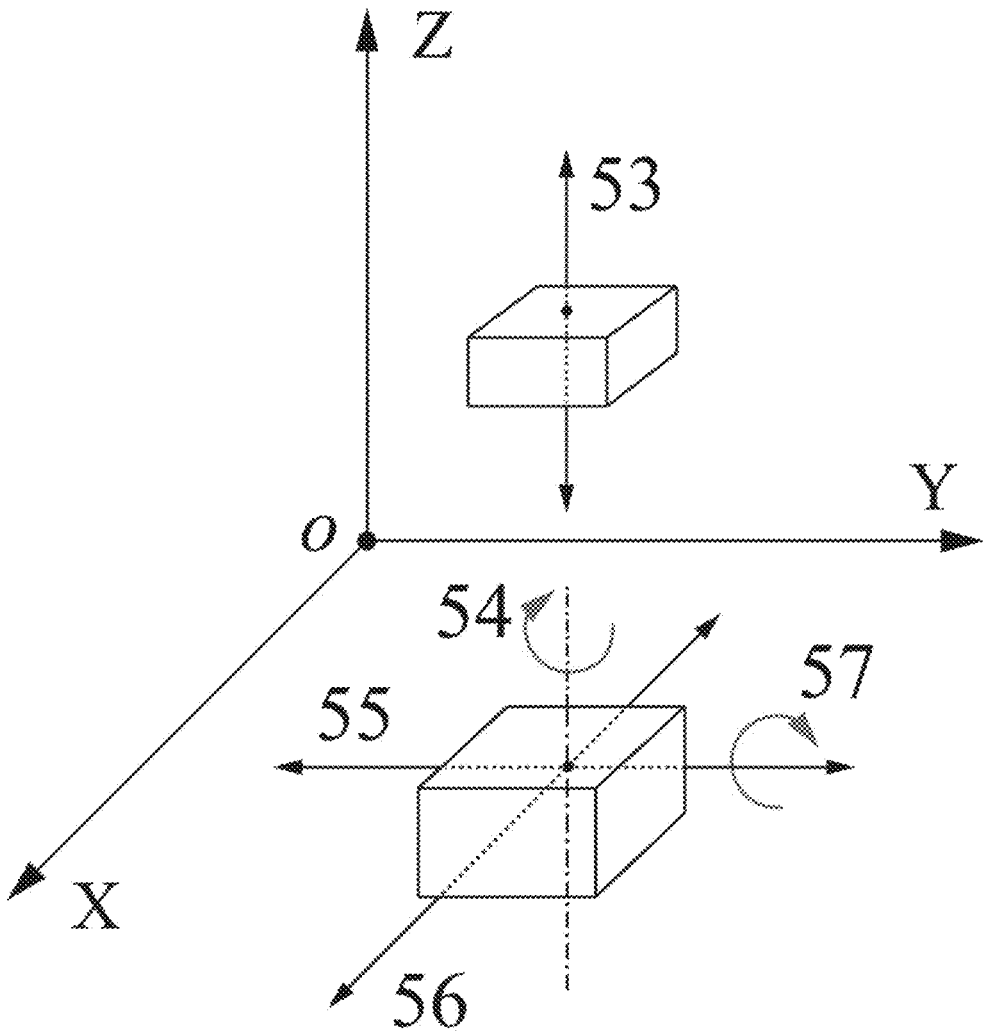
FIG. 4 is a principle schematic view of motion relationship of an airflow-assisted electro-fluid conformal printing device constructed in accordance with a preferred embodiment of the present disclosure.
Figure 5:
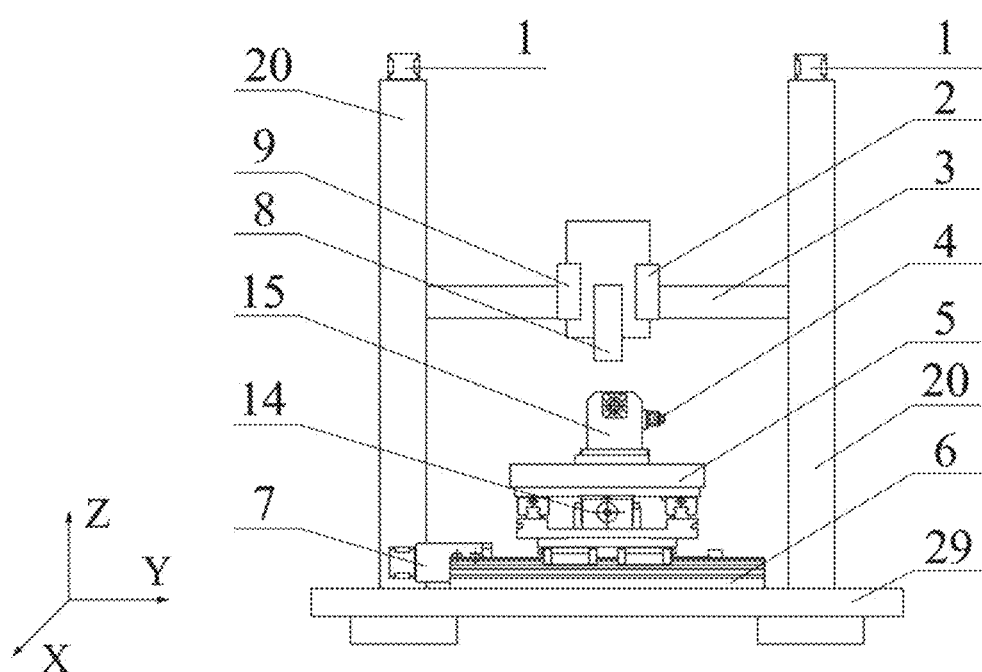
FIG. 5 is a front view of the structure of the airflow-assisted electro-fluid conformal printing device constructed in accordance with the preferred embodiment of the present disclosure.
Figure 6:
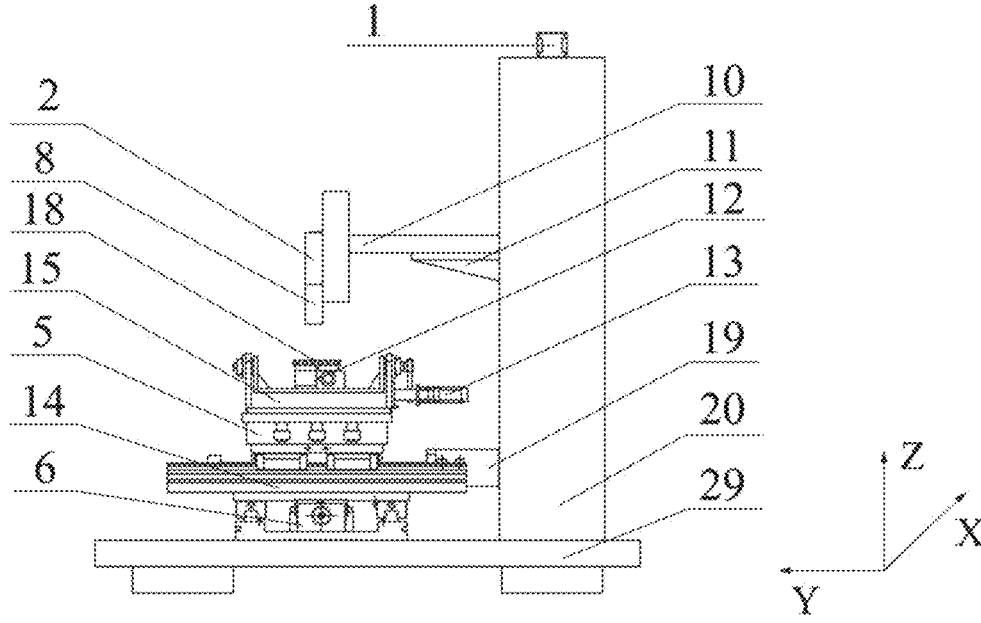
FIG. 6 is a schematic left view of an airflow-assisted electro-fluid conformal printing device constructed in accordance with a preferred embodiment of the present disclosure.
Figure 7:
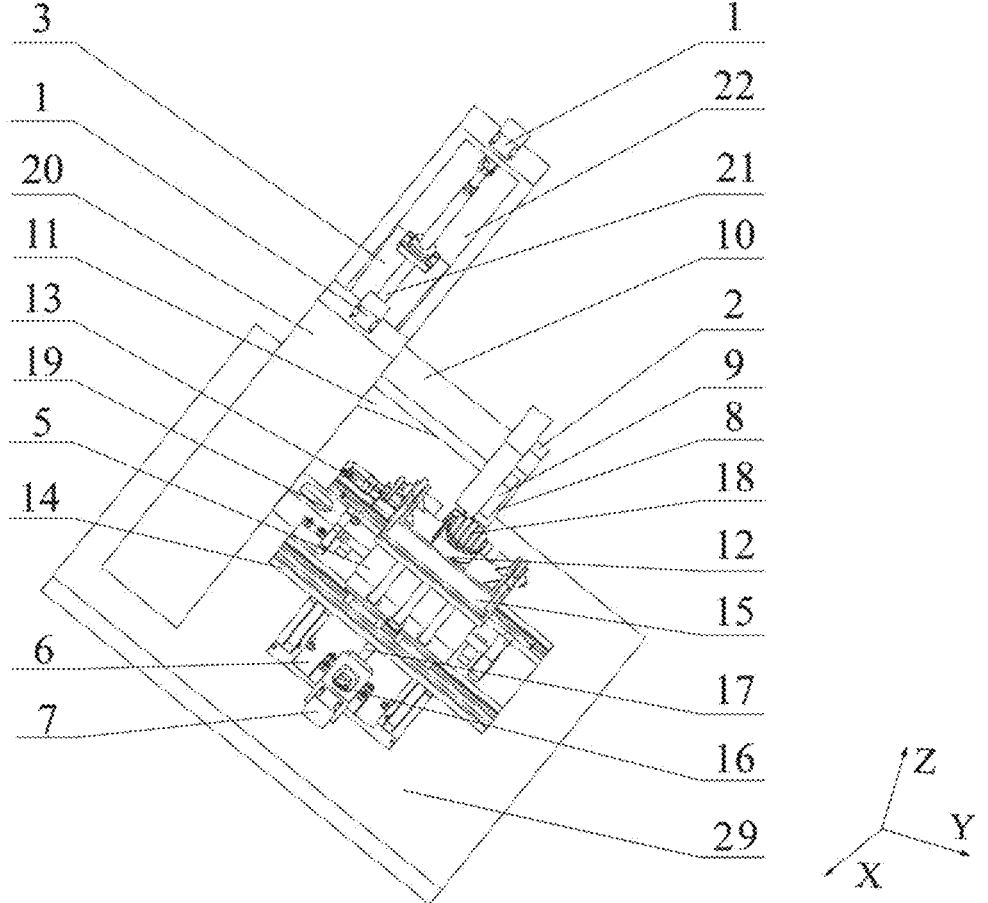
FIG. 7 is a schematic side view of an airflow-assisted electro-fluid conformal printing device constructed in accordance with a preferred embodiment of the present disclosure.
Figure 8:
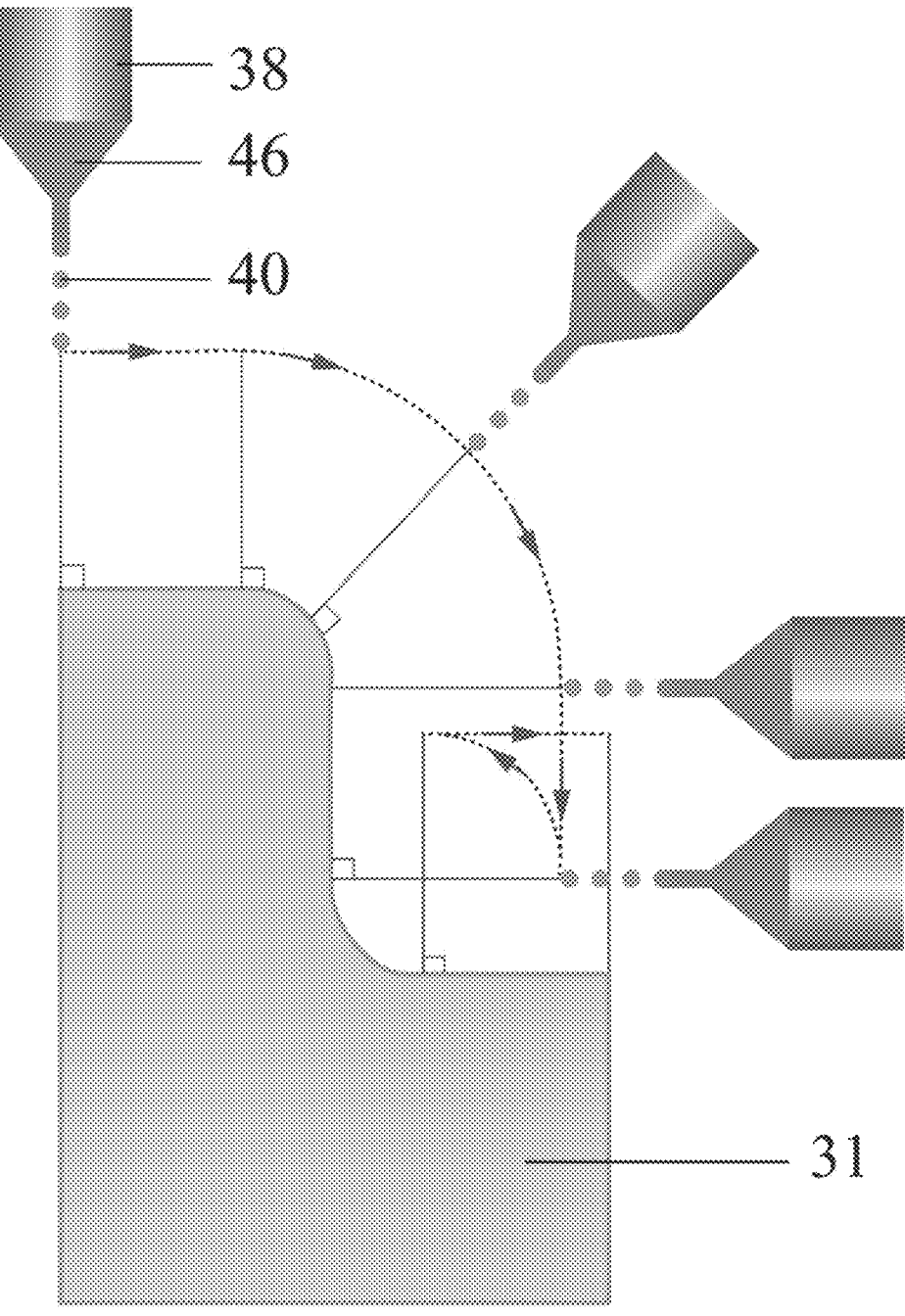
FIG. 8 is a schematic view of a print-head printing a curved-surface conformal circuit on a non-planar insulating substrate constructed in accordance with a preferred embodiment of the present disclosure.

According to the embodiment of the present disclosure, the nozzle 46 may be a flow-focusing micro-nozzle and comprises a capillary glass tube 64, an annular piezoelectric material 61 bonded to an outer surface of the capillary glass tube 64, and a metal protective housing 60 wrapped around outer surfaces of the capillary glass tube 64 and the annular piezoelectric material 61. As shown in FIG. 3, an inner space of the capillary glass tube 64 forms an ink chamber 63 to provide a solution to the nozzle 46. The capillary glass tube 64 is formed with a nozzle outlet 62 having an inverted conical orifice at the lower end, and a nozzle inlet 59 at the upper end. The nozzle inlet 59 is connected to the liquid delivery tube 24 for delivering the solution in the ink tank 36 to the ink chamber 63 via the liquid delivery tube 24 via the nozzle inlet 59. In addition, the annular piezoelectric material 61 is sequentially connected to a wire (not shown) and an electrically driven controller (not shown) to provide the electrical signals required by the nozzle 46 to generate the high frequency ink droplets 40.

The nozzle 46 is an elongated tube structure, and the diameter of the nozzle 46 is allowed to be slightly larger than the diameter of the nozzle of an ordinary electro-fluid inkjet printing device, thereby reducing the processing difficulty of the nozzle 46 and increasing the efficiency of fabrication. In order to enable the airflow-assisted electro-fluid conformal printing device of the present disclosure to accomplish the printing and jetting work for various complex curved surfaces, in particular the printing for surfaces with many recesses, the volume of the print-head module 8 cannot be too large, or else it will produce a phenomenon that the print-head module 8 interferes with a surface of the work-pieces, and it will not be able to accurately approach the surface to be printed. The print-head module 8 of the present disclosure can be used with a single-pipe typed print-head or multiple print-heads according to an actual demand, as long as the size of the nozzle 46 meets the narrowest shape demand of the curved-surface base material 31 to be printed, so that it may realize a simultaneously ink jetting by multi-material nozzles under the permission of the shape of the surface, so as to improve the printing speed.

In addition, according to the embodiment of the present disclosure, the capillary glass tube 64 has a smooth surface, and the surface roughness of an gas tube 47 and an air outlet 49 is less than the thickness of a surface boundary layer of the air outlet 49, which is not only detrimental to the formation of turbulence and backflow, but also conducive to removing impurities and preventing the gas tube from clogging.

According to the embodiment of the present disclosure, the airflow assisting structure is used to apply an assisted airflow between the nozzle 46 and the electrode ring 50, and when the ink is ejected, the assisted airflow will flow through the channel to form an airflow casing, which will enclose the jet 28 ejected from the nozzle 46 to maintain the jet 28 have a stable shape and speed, and to change the moving direction thereof to guide the jet 28 to precisely print onto the surface of the curved-surface base material 31 below the nozzle 46 and the electrode ring 50. By controlling the flow of the airflow, the jetting position and shape of the ink can be precisely controlled, thus realizing higher resolution and a higher quality printing effect.

The airflow assisting structure includes a structure body 51, and the structure body is formed with a conical chamber 52, a gas tube 47, and an air outlet 49, which pass through the structure body 51 in a vertical direction and communicate to each other. The conical chamber 52 and the gas tube 47 are coaxially disposed with the nozzle 46 at a periphery of the nozzle 46, and the conical chamber 52 is formed at the upper end of the structure body 51 and has a diameter tapered toward the gas tube 47. The gas tube 47 is formed at the lower end of the conical chamber 52 and has an inner diameter larger than an outer diameter of the nozzle 46 to uniformly and steadily pass an assisted airflow between the gas tube 47 and the nozzle 46, to guide the airflow to converge around the jet 28. The lower end of the gas tube 47 is tapered toward the lower surface of the structure body 51 to form an air outlet 49, having a diameter substantially equal to, but slightly larger than, the diameter of the nozzle 46, on the structure body 51. The air outlet 49 is provided coaxially with the nozzle outlet 62 of the nozzle 46 and the air outlet 49 is provided spaced apart below the nozzle outlet 62. In this situation, since the diameter of the air outlet 49 is smaller than the inner diameter of the gas tube 47 and larger than the outer diameter of the nozzle 46, when the assisting airflow flowing between the gas tube 47 and the nozzle 46 flows to the air outlet 49, a sharply constricted airflow is formed between the air outlet 49 and the nozzle 46, whereby the assisting airflow acts as a focusing effect on the liquid flowing out of the nozzle 46.

In addition, the electrode ring 50 is disposed at the bottom end of the airflow assisting structure, specifically, the electrode ring 50 is disposed on the lower surface of the structure body 51, and the hole formed in the center of the electrode ring 50 may have a same dimensions as that of the air outlet 49, for example, they have the same diameter and are arranged coaxially. The electrode ring 50 is coaxially arranged with the nozzle 46, whereby the voltage between the electrode ring 50 and the curved-surface base material 31 may be reduced, thereby reducing the effect of the polarization of the curved-surface base material 31 on the printing effect. The electrode ring 50 may also focus the jet 28 to achieve an effect of suppressing satellite droplets.

In this case, since the nozzle 46 maintains a fixed distance from the air outlet 49 at the bottom end of the structure body 51, the electrode rings 50 having different thicknesses can be installed according to the requirements of the jetting process, so that the distance between the electrode ring 50 and the nozzle 46 can be adjusted, thereby achieving a desired ejecting precision or ejecting distance.

The airflow assisting structure further comprises a gas buffer chamber 45, and the gas buffer chamber 45 is designed in a circle ring shape and is located above the structure body 51. The gas buffer chamber 45 is connected to the conical chamber 52 through a cylindrical shaped intermediate connector 34 and a plurality of cylindrical shaped peripheral connectors 33, the peripheral connectors 33 and the intermediate connectors 34 both are hollow, and the nozzle 46 is coaxially built into the intermediate connector 34. In addition, the air inlet 35 is formed on one side of the gas buffer chamber 45, the gas may flow into the gas buffer chamber 45 through the air inlet 35 for buffering, the buffered gas flows into the conical chamber 52 through the plurality of peripheral connectors 33 and focuses on the tip portion of the nozzle 46 through the conical airflow channel, so as to act on the solution ejected from the nozzle 46 for printing to improve the printing accuracy of the solution. A transition surfaces of the conical airflow channel are all smooth arc transition surfaces, which can ensure the smooth flow of the airflow, avoid generating airflow vortices, reduce the interference of the airflow, and help to improve the constraining effect of the airflow and to enhance the stability of the jet of the printing solution.

In this way, the airflow flowing into the gas buffer chamber 45 through the air inlet 35 can converge and flow into the gas tube 47 after being homogenized by the conical chamber 52, and the airflow flows downwardly from the cylindrical region between an outer wall of the nozzle 46 and the gas tube 47, and gradually focuses on the electro-fluid jet 28 ejected from the nozzle 46. The jet 28 is ejected from the air outlet 49 of the structure body 51, and by means of the assisted airflow, the ink is precisely ejected onto the curved-surface base material 31 to be printed. In this regard, the central pneumatic compressor 23 is used as compressing air source, which is capable of delivering 125 psi of compressed air, and it uses a custom-made regulator with 2 psi resolution to control the compressed air delivered to the air inlet 35.

The electrical signal portion includes a flow pump 37 and a high-voltage power supply 26 and a high-voltage amplifier 25 for applying a voltage to the ink in the ink tank 36 and to the electrode ring 50. When a circuit is printed on a curved-surface base material 31 placed on a worktable 29, the nozzle 46 is connected to a first positive voltage, the electrode ring 50 is connected to a second positive voltage, the curved-surface base material 31 is connected to a negative voltage, and the worktable 29 is grounded so that a potential of the curved-surface base material 31 to be printed is zero. The nozzle 46 is applied with a voltage higher than the voltage applied to the electrode ring 50 (i.e., the first positive voltage is higher than the second positive voltage), so that a gradient potential difference is formed among the nozzle 46, the electrode ring 50, and the curved surface base material 31 to be printed, and the voltage between electrode ring 50 and the worktable 29 is lowered through multi-stages voltage controlling to reduce the effect of the insulating substrate polarization on the printing.

As described above, the ink tank 36 is disposed above the gas buffer chamber 45 and connected to the nozzle 46 via the liquid delivery tube 24. The ink in the ink tank 36 is steadily supplied to the nozzle 46 via the liquid delivery tube 24 under drive of the flow pump 37. The high voltage power supply 26 applies a high alternating voltage to the conductive ink via the high voltage amplifier 25, and applies a low voltage to the electrode ring 50 via the high voltage amplifier 25, and the potential on the curved-surface base material 31 to be printed is zero. Through multi-stages voltage controlling and assisted airflow, a stable curved-surface electric field that does not change with the attitude movements of the printed curved-surface base material 31 is formed between the nozzle 46 and the curved-surface base material 31, thereby providing a stable force field for the conductive ink at the nozzle 46, and the tip of the nozzle 46 forms an electro-spun jet under the action of the high-voltage electric field. It is unavoidably to generate jet adhesion, and the assisted airflow is uniformly and stably passing between the gas tube 47 and the nozzle 46. The airflow converges around the electro-fluid jet so that it has a better focus and constraint effect to the jet 28, which can be a good solution to solve the problem of jet adhesion.

The ink in the ink tank 36 is supplied to the nozzle 46 via the liquid delivery tube 24 under the drive of the flow pump 37. The high voltage power supply 26 is used for applying a alternating voltage required for electro-fluid inkjet printing to the nozzle 46 and the electrode ring 50, and the voltage signal is enlarged by the high-voltage amplifier 25 and then loaded onto the nozzle 46 and the electrode ring 50, which applies a high alternating voltage to the conductive ink, and applies a low voltage to the electrode ring 50, so as to achieve the high-voltage range for the electro-fluid inkjet printing requirements. Different electrical signals can make the nozzle 46 to produce three different printing modes of electro-fluid inkjet printing jet, such as electro-dot ejecting, electro-eject coating and electrostatic spinning. Wherein, the electro-dot ejecting is an ejection of liquid droplets achieved by changing the bias voltage or pulse waveform under a medium voltage, low voltage and a low flow supply. The electro-eject coating is to deposit liquid droplets atomized using electric field to a collection substrate under a high voltage, a medium voltage and low flow supply, and it usually uses a colloidal solution containing micro-nano particles. The electrostatic spinning is, under a low voltage and a high flow supply, to form a continuous jet by the ejected ink and deposit it on a collection substrate in a form of fibers. The print-head module 8 is connected to alternating positive and negative AC voltage signals, so that the ink droplets 40 printed on the curved-surfaced base material 31 also carry alternating positive and negative charges, which can avoid the problem of charge accumulating when printing over long periods of time on the curved-surface base material 31, and reduce the effect of the charges on the jets 28 by neutralizing the charges carried by the ink droplets 40 to solve a print instability problem caused by charge accumulation effects of any insulation substrate such as a first insulation layer 44 and a second insulation layer 42.

The present disclosure uses the method of airflow assisting as a complementary method to address the inherent limitations of electro-fluid printing, and the method is a dual manufacturing process that combines two methods. When the printing material is a conductive ink that is sensitive to electric field, the airflow, as an auxiliary process, is coaxially applied to the electro-fluid jet 28. When the print material is a material that is insensitive to electric fields, the airflow focusing ejection, as a primary process, completes the focusing ejection of the ink droplets 40, and deposits inks insensitive to electrical property at a higher production rate. The nozzle 46 is coaxially positioned over the air outlet 49. A sharply constricted airflow is formed between the nozzle

46 and the air outlet 49, and the airflow acts as a focusing effect for the liquid insensitive to electrical property flown out form the nozzle 46, causing the liquid to form a cone at the tip (i.e., at a small hole) of the nozzle 46, which is similar in shape to the Taylor's cone 48 produced in electro-fluid inkjet printing. When the airflow assisting electro-fluid inkjet printing method is used, compressed air is allowed to enter the gas buffer chamber 45, the print-head module 8 is supplied with a high positive voltage, the electrode ring 50 is supplied with a low positive voltage, the worktable 29 is grounded, and a strong electric field is formed between the nozzles 46 and the curved-surface base material 31. The liquid is withdrawn from the nozzles 46 by electric power through the auxiliary of the airflow field, and electro-fluid ejection assisted by airflow may accelerate the speed of the ink jetting, breaking through the strong dependence of the size of the ink droplets or jets on the flow speed. Through the continuous micro-jet produced by the co-flow airflow, it may deposit the ink at a higher production rate, and its printing capability is not limited by the ink viscosity. When only the airflow focusing inkjet method is used, the switch is turned off, and the electric field between the nozzle 46 and the curved-surface base material 31 is removed. The curved-surface base material 31 does not need to be grounded, and at the same time, the curved-surface base material 31 can be any curved-surface substrate or non-curved-surface substrate made of an insulating material. When the pressurized gas enters the gas buffer chamber 45, it forces the ink chamber 63 to form a pointed cone similar to the Taylor's cone 48, and then the liquid jet is ejected from the orifice following by the flowing gas.

2. Mechanical Structure

The mechanical structure of the high-precision airflow-assisted electro-fluid conformal printing device is designed using a five-axis linkage mechanical structure.

In FIGS. 4, 5, 6, and 7, the five-axis linkage mechanical structure includes an X-axis drive motor 7, a Y-axis drive motor 19, and a Z-axis drive motor 1. The X-axis drive motor 7, Y-axis drive motor 19, and Z-axis drive motor 1 receive control commands from the upper computer 27, and are driven via a coupling 16 through a first drive assembly 6, a second drive assembly 14, and a third drive assembly 22 formed by a X-axis drive screw 17, a Y-axis drive screw, a Z-axis drive screw 21, and a guide rail, to realize a horizontal free movements of the worktable 29, on which the base material to be printed is placed, in the X, Y and Z directions.

The support plate 3 is connected between two vertical support columns 20 and can move up and down. The connecting substrate 10 is fixed at front of a transverse support plate 3 through the rib plate 11. The print-head module 8 on the connecting substrate 10 moves linearly in the Z direction. A two-dimensional rotating table 18 as a whole moves linearly in the X-axis direction 56 and moves linearly in the Y-axis direction 55. The worktable 29 has a mechanical fixture for fixing the curved-surface base material 31 to be inkjet printed and connecting to the first drive assembly 6 with high strength. The B-axis drive motor 13 used for tilting the two-dimensional rotating table 18 receives the control commands from the upper computer 27 and drives the first rotating drive assembly 15 to make a B-direction rotational movement 57 around the Y-axis, so as to drive the two-dimensional rotating table 18 disposed on the first rotating drive assembly 15 to make a B-direction rotating movement 57. The C-axis drive motor 4 receives the control instructions and drives the two-dimensional rotating table 18 to make a C-direction rotational movement 54 around the Z-axis. The three linear movements and two rotational movements realize a movement function of five-axis linkage, which can inkjet print directly on any complex curved-surface circuit.

The entity to be printed (i.e., the curved-surface base material 31 to be inkjet printed) is mounted on the two-dimensional rotating table 18, and the first rotating drive assembly 15 under the two-dimensional rotating table 18 can rotate about the Y-axis (B-direction rotating motion 57), while the second rotating drive assembly 12 is mounted on the table surface of the first rotating drive assembly 15, and the second rotating drive assembly 12 can rotate about a normal line perpendicular to the of the plane of the first rotating drive assembly 15, to achieve the C-direction rotational motion 54. The two-dimensional rotating table 18 is mounted on a moving slide table 5 that performs a left-right translational movement in the Y-direction. The second drive assembly 14 is mounted on the first drive assembly 6 that performs an translational movement in the X-direction, and the second drive assembly 14 performs a left-right transla-tional movement along with the moving slide table 5 in the Y-direction. The print-head module 8 is mounted on the connecting substrate 10 that can perform a translational movement in the Z-direction, to realize a translational move-ment in the Z-direction. Through the relative motion of the entity to be printed and the print-head module 8, three translational movements in the X-axis direction 56, Y-axis direction 55, and Z-axis direction 53, and two rotational movements in the B-direction rotational movement 57 and the C-direction rotational movement 54 are realized, thus realizing five-axis linkage mechanical structure. In the pres-ent disclosure, the nozzles 46 may arrive to any position on the curved-surface base material 31 to be inkjet printed, so that the five-axis mechanical structure can realize a vertical printing of the nozzle 46 on any position of the curved-surface base material 31, to realize the basic motion require-ments for three-dimensional stereo printing.

3. Vision System

As shown in FIGS. 1, 5, 7 and 8, the vision system is mainly used to achieve alignment and real-time visual monitoring of the curved-surface base material 31 to be inkjet printed during the ejecting process of the print-head module 8, and the vision system includes a positioning camera 9 and an observation camera 2.

The positioning camera 9 is used for realizing a real-time accurate positioning between the curved-surface base mate-rial 31 and the nozzle 46. At the start of printing, a special logo (generally a crosshair, but can also be other shapes) is firstly printed on the photo paper, while the positioning camera 9 adopts an independent high-resolution camera for image acquisition of the logo, and according to the image recognition technology, it decomposes the deviation of the surface at this position in the five degrees of freedom of X, Y, Z, B, and C; according to the deviation, it controls the motions in five axes for correcting the deviation; and after the correction is completed, the curved-surface circuit inkjet printing can be carried out directly. Wherein, the deviation correction control on the five degrees of freedom is an automated closed-loop system for automatically correcting the deviation in the direction of the five degrees of freedom, which detects the relative position of the edges of the printed cross-shaped pattern by means of a deviation correction sensor, and then the control system compares the deviation amount of the detected value and the set value, and sends a signal to the motorized actuator for correcting the deviation.

During the printing process, the observation camera 2 is used to observe in real time the Taylor's cone 48 of the electro-hydro inkjet printing jet and the jet 28 of the airflow focusing ejection during the inkjet printing process, and by monitoring the form of the jet 28 during the whole process, the liquid state of the end of the nozzle 46 can be observed in real time, and the parameters of the inkjet printing process can be adjusted in time, so as to inkjet print a desired high-quality, high-precision curved-surface circuits.

4. Numerical Control System

The numerical control system of high-precision airflow-assisted electro-fluid conformal printing device is core of the entire device, and with the above five-axis linkage mechani-cal structure and inkjet printing system (including the print-head module 8, airflow assisting structure and electrical signal supplying portion), the numerical control system couples the five-axis linkage motion controlling and printing controlling tightly, while fully utilizes an advantages of the software to achieve a function of motion trajectory planning for an entity from the three-dimensional curved-surface modeling, achieving a complete three-dimensional inkjet printing function.

The numerical control system according to the present disclosure not only can meet the requirements of various real-time motion control and synchronous inkjet printing control, but also has powerful function for curved-surface space motion trajectory planning. Therefore, the numerical control system has strong real-time control ability, synchro-nous control ability, three-dimensional modeling processing ability, computer-aided design and computer-auxiliary machining (CAD/CAM) processing ability, and the like. The high-precision airflow-assisted electro-fluid conformal printing device of the present disclosure adopts a control system with a multi-universal parallel processing structure to complete different tasks respectively, and the systems of a plurality of computers realize real-time data interaction therebetween through a real-time data link to complete the task of parallel control.

The numerical control system of the present disclosure includes a three-axis motion control part, a two-axis rotation control part and an electric signal control part, all of which are realized in the form of integrating control card and software. Wherein, the three-axis motion control part and the two-axis rotation control part are used for controlling the cooperative movement of the motion module to realize inkjet printing a circuit on a complex curved surface accord-ing to the requirements. The electrical signal control part includes an ejection control of the electro-fluid and an ejection control of the assisted airflow, and it is used for the high voltage power supply 26 and the flow pump 37 to provide electrical signals and flow speeds for the conformal inkjet printing stamp. By controlling the supplied electrical signals and flow speeds, it is possible to realize a real-time and on-demand control of the inkjet printing process on any curved surface in combination with the precise control of the motion module.

For example, the multi-axis linkage system of the present disclosure controls a plurality of print-heads to achieve synchronous coordinated movement, and the movement of each print-head is driven by an independent driving mecha-nism, wherein each print-head is equipped with correspond-ing ink of different kinds of materials.

Figure 10:
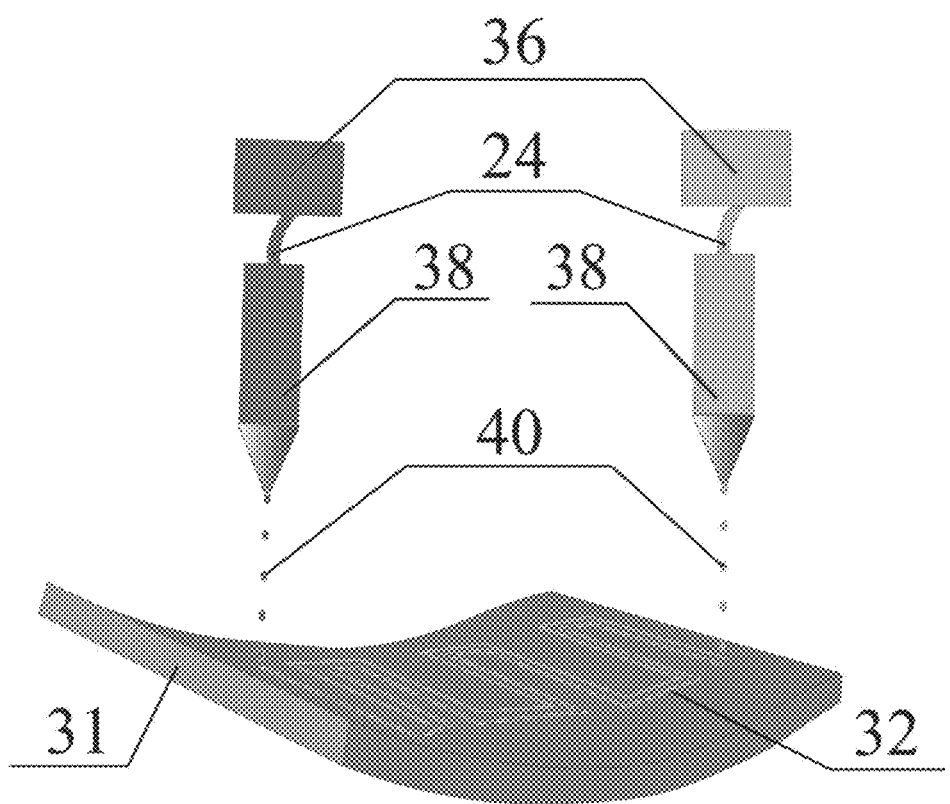
FIG. 10 is a schematic view of direct conformal printing of single-layer curved-surface circuits constructed in accordance with a preferred embodiment of the present disclosure.
Figure 11:
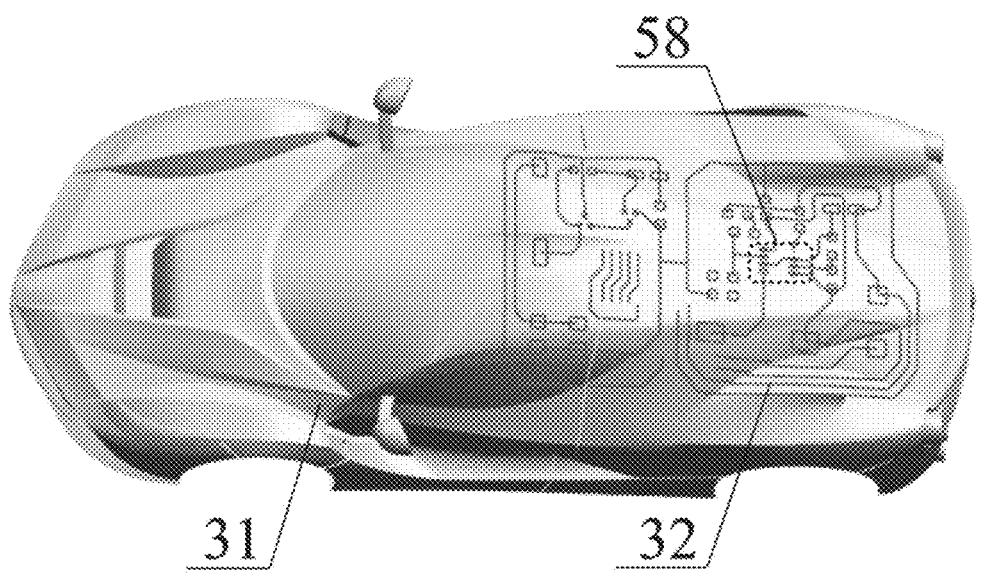
FIG. 11 is a schematic view of an embodiment of direct conformal printing of curved-surface circuits constructed in accordance with preferred embodiments of the present disclosure.

As shown in FIG. 10, when printing a single-layer het-erogeneous conductive pattern, the upper computer 27 con-trols the print-heads 38 equipped with different kinds of conductive ink to cooperate, and each print-head finishes inkjet printing in an orderly manner according to a planned path.

Figure 9:
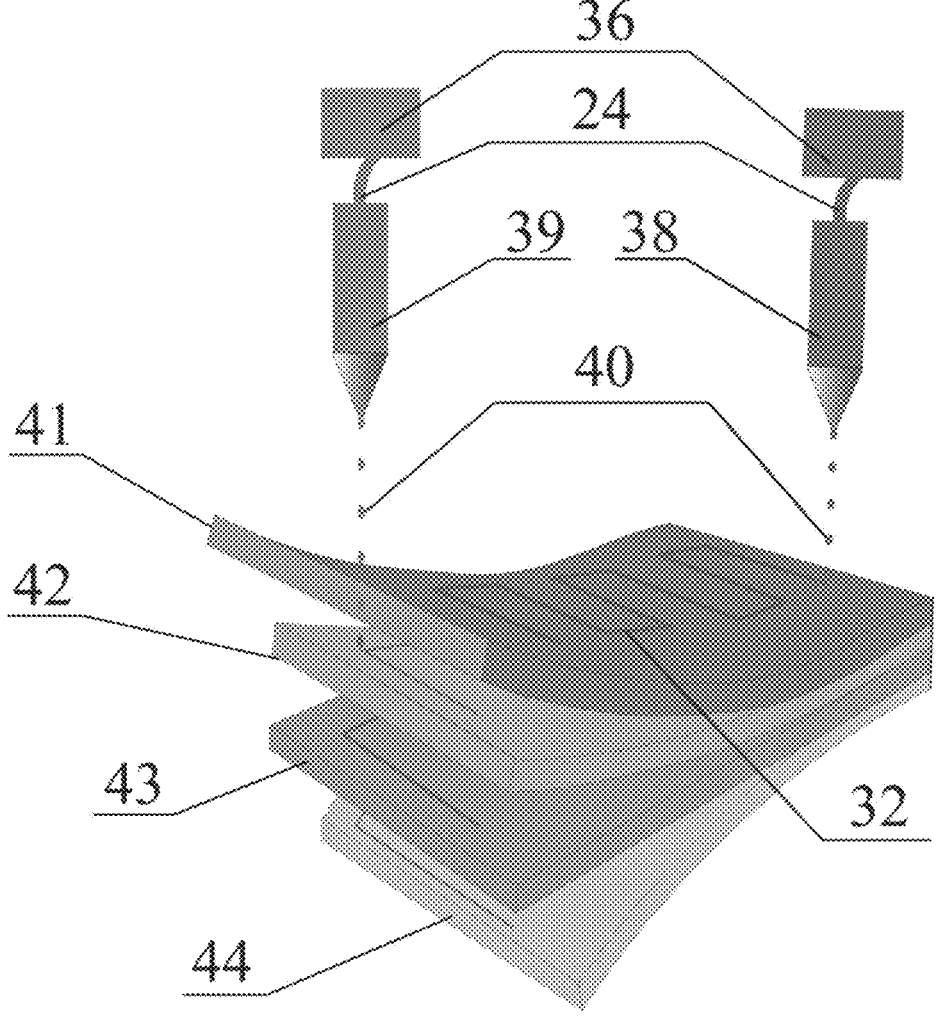
FIG. 9 is a schematic view of direct conformal printing of multilayer curved-surface circuits constructed in accordance with a preferred embodiment of the present disclosure.

As shown in FIG. 9, when printing a multilayer heterogeneous curved-surface circuit, the multilayer curved-surface circuit is formed by stacking the first insulating layer 44, the first conductive layer 43, the second insulating layer 42 and the second conductive layer 41, respectively, and the conductive ink print-head 38 and the insulating ink print-head 39 are linked. By coordinating the movement and printing tasks of the two nozzles, they can work according to the predetermined path and sequence, so as to achieve the effect of synchronization and coordination. Specifically: firstly, the first insulating layer 44 is printed by the insulating ink print-head 39, the first conductive layer 43 is printed by the conductive ink print-head 38, and then the second insulating layer 42 is printed by the insulating ink print-head 39, and the second conductive layer 41 is printed by the conductive ink print-head 38, and as such, the printing of the multilayer conductive circuit is completed by layer-by-layer accumulation and overprinting. In the multilayer heterogeneous curved-surface circuit, the conductive layer is used to transmit current and signal, and the insulating layer is used to insulate and protect the conductive layer. The conductive ink print-head 38 and the insulating ink print-head 39 are interconnected and coordinated to eject conductive material and the insulating material, and the ejected material is quickly cured and molded by the high-energy thermal effect of laser, so that two or more layers of curved-surface circuits can be realized by direct inkjet printing.

Based on the conformal printing device provided by the present disclosure, the present disclosure also provides a high-resolution complex curved-surface circuit direct conformal inkjet printing method. FIG. 10 is a schematic diagram of the conformal direct inkjet printing of a curved-surface circuit constructed in accordance with a preferred example of the present disclosure, and as shown in FIG. 10, inkjet printing a pattern on the surface of this curved-surface base material specifically includes the following steps:

1. Circuit logic design is performed according to an electronic function to be realized by the curved-surface circuit, to formulate a planar PCB circuit schematic diagram for the curved-surface circuit. The PCB circuit diagram is divided into functional areas based on the composition of the integrated circuit, a suitable chip type is selected, and a chip mounting area 58 is reserved. In the multilayer PCB circuit design, in order to ensure the integrity of the signal, a stacking sequence of the signal layer and the power supply layer should be reasonably selected, a coupling between the signal layers should be reduced, and a heat dissipation structure should be reasonably designed. In the case of satisfying the performance parameters of the application circuit, high-performance electronic elements with low loss, low thermal resistance and low power consumption are tried to be selected.

2. According to the design and functional partitioning results of the planar logic circuits obtained in step 1, a PCB layout design for curved-surface circuits is performed. Specifically, considering a limitation of the curved-surface space, core components such as electronic elements, electronic modules and interconnection circuits should be three-dimensionally, miniaturized and high-precision conformally integrated on the surface of the product, and a connection manner between elements in the curved-surface electronic system and a layout of signal transmission paths should be in accordance with the laws of electromagnetic action. Then, a three-dimensional model of the curved-surface object to be inkjet printed can be established according to a physical product to which the curved-surface circuit is to be applied (i.e., the curved-surface base material 31 is formed), and the planar circuit diagram is arranged on the three-dimensional model of the curved-surface base material 31 following the surface shape according to the curvature magnitude at each position on the three-dimensional model of the curved-surface base material 31 and process state requirements, so as to complete the three-dimensional modeling of the digital curved-surface integrated circuit.

3. A printing path trajectory is planned for the line to be inkjet printed extracted in step 2 according to the print circuit pattern, the print-head module 8 moves directionally and quantitatively on the surface of the complex curved-surface base material 31 and performs a motion interference inspection, to ensure that the inkjet printing direction is always perpendicular to the surface of the base material 31 to be inkjet printed. Process state requirements are parsed into conformal printing commands to form a CLSF file for the movement position of the electro-fluid on-demand micro-droplet eject nozzle and an NC code for controlling the movement of the print-head, so as to complete a spatial motion trajectory planning required for conformal inkjet printing of curved-surface circuits and generate a print path file.

4. A surface pretreatment for the curved-surface base material 31 is performed to improve a microscopic roughness of the surface of the curved-surface base material 31, to increase a surface adhesion force, and to control a spreading process of the ejected ink droplets 40. As shown in FIG. 1, the surface pretreated curved-surface base material 31 is disposed under the laser sintering part 30 for being sintered and cured. A nano-metal conductive ink is irradiated in real time and synchronously by continuous or pulsed laser, the ink is sintered by the high-energy thermal effect generated by the laser to make it conductive, and the treated curved-surface base material 31 is clamped on the worktable 29 for conformal inkjet printing after an adhesion test.

5. The obtained numerical control NC processing code and the generated path file are imported into a digital curved-surface circuit printing device, and appropriate process printing parameters are set according to the working conditions. The conformal inkjet printing device executes the NC processing code to perform conformal direct inkjet printing of the inkjet printing pattern 32 on the curved-surface base material 31. The ink droplets 40 are cured in the process of inkjet printing using a laser sintering part 30 to achieve, for example, a circuit structure comprising a first insulating layer 44, a first conductive layer 43, a second insulating layer 42, and a second conductive layer 41. The heat energy generated by the laser sinters and cures the ink, causing the nano-silver particles in the conductive layer to melt and bind together to form a continuum conductive path, thereby making the conductive layer have conductive property. During the inkjet printing process, the online visual inspection system is turned on at the same time, and the observation camera 2 is used to visually display various forms of the printing process in real time, and timely adjust the inkjet printing with the best process parameters.

6. The curved-surface conformal circuit obtained in step S is processed by cleaning and nitrogen blow-drying to completely remove the dirt on the curved-surface conformal circuit and curved-surface base material 31 during the inkjet printing process.

7. Then, chip and electronic elements are mounted in the chip mounting area 58 and electrically connected to the curved-surface conformal circuit obtained in step 6 to obtain a curved surface circuit with a preset function.

8. The curved-surface circuit obtained in step 7 is functionally tested, and the test results are evaluated according to engineering requirements and performance indexes. After passing, the surface structure of the curved-surface circuit is sprayed with a surface protective coating, and a complete curved-surface conformal circuit is completed by manufacturing.

The present disclosure provides a high-precision airflow-assisted electro-fluid conformal printing device, in which the airflow-assisted electro-inkjet printing system thereof realizes a conformal printing on curved surfaces using electro-fluid through a five-axis linkage system, breaks through the limitation of the non-planar substrate shape on the uniformity of the applied electric field, and solves the problem of the interference of curved-surface electric field on the electro-fluid inkjet printing jet. Through the built-in electrode ring for integrating electrodes into the print-head of the airflow-assisted electro-inkjet printing, the voltage between the electrode ring and the insulating substrate is significantly reduced, and the problem of the influence of the polarization of the insulating substrate on the electro-fluid printing is solved. By mounting electrode rings with different thicknesses, the distance between the electrode ring and the nozzle can be adjusted, which is easy to operate. Through applying the assisted airflow between the printing nozzle and the electrode ring, the airflow changes the direction of the movement of the jet ejected from the nozzle, which not only guides the jet to precise positioning, but also breaks through the limitations of the limited distance between the print-head and the substrate, and improves the precision of electro-fluid inkjet printing. Through the air focusing flow, it can more widely print materials that are not sensitive to the electric field, breaking through the limitations of the print material by the conductivity itself, and broadening the application range of the print material. Through the air focusing to assist the electro-fluid-printing, a higher Reynolds number of fluids can be ejected, which eliminates a strong dependence of the size of the ink droplets or jets on the flow speed, improving the ejecting efficiency. Through the gas buffer chamber and the conical airflow channel, buffering and focusing of the airflow are achieved, which improves the printing quality. The nozzle is treated with a hydrophobic coating to prevent the liquid from wetting the edge of the nozzle. The assisted airflow is used to focus the liquid flowing out of the nozzle, so that the liquid forms a cone at the tip of the nozzle (that is, at the small hole), the shape of which is similar to that of the Taylor's cone produced in the electro-fluid inkjet printing. In addition, among the observation camera and the positioning camera in the vision system, the observation camera is used to observe the Taylor's cone of the jet of the electro-fluid inkjet printing in real time during printing process by aligning with the nozzle, and the positioning camera is used to achieve a precise positioning between the curved-surface base material and the nozzle in real time by directing to the curved surface, so as to improve the printing quality.

It is easily understood by those skilled in the art that the above is only a preferred embodiment of the present disclosure, and is not intended to limit the present disclosure, and any modifications, equivalent replacements, and improvements made within the spirit and principles of the present disclosure shall be included in the scope of protection of the present disclosure.

What is claimed is:

1. A conformal printing device for curved-surface circuit, comprising:
  a device body comprising a stand and a support plate movable with respect to the stand;

a print-head module mounted on the support plate, comprising a piezoelectric nozzle and an airflow assisting structure for applying an assisted airflow to guide charged jet ejected from the nozzle to be precisely printed onto a curved-surface base material below the nozzle;
a motion module mounted on the device body, for making a tangent of a surface, on which a printing position of the curved-surface base material to be printed is located, be always perpendicular to a jet ejected from the nozzle, ensuring that the print-head module moves following the curved-surface shape and realizing conformal printing circuits on any complex curved surfaces,
wherein the airflow assisting structure comprises a gas buffer chamber and a structure body disposed below the gas buffer chamber,
the structure body is formed with a conical chamber, a gas tube connected to the conical chamber and an air outlet formed at a lower end of the gas tube therein,
an upper end of the conical chamber is connected to the gas buffer chamber, the conical chamber and the gas tube are coaxially disposed around the nozzle so as to form a space for gas flowing between an outer wall of the nozzle and an inner wall of the conical chamber and the gas tube,
an outlet of the nozzle is coaxially disposed with the air outlet and located above the air outlet.

2. The conformal printing device for curved-surface circuit according to claim 1, wherein the nozzle is a flow focusing micro-nozzle, comprises a capillary glass tube and an annular piezoelectric material bonded to an outer surface of the capillary glass tube,
  the capillary glass tube has a nozzle outlet with an inverted conical hole at one end and a nozzle inlet at the other end to provide ink for the nozzle, and a hollow portion between the two ends is an ink chamber,
  the capillary glass tube is wrapped with a metal protective housing on the outer surface thereof, and
  the piezoelectric material is connected to an electric drive controller by a wire to provide an electrical signal required for generating ink droplets.

3. The conformal printing device for curved-surface circuit according to claim 1, wherein the gas buffer chamber is in a ring shape, the gas buffer chamber and the conical chamber are connected by a peripheral connector and an intermediate connector which are both in hollow cylindrical shapes, and the nozzle is coaxially built into the intermediate connector.

4. The conformal printing device for curved-surface circuit according to claim 1, wherein a diameter of the air outlet is smaller than an inner diameter of the gas tube and larger than a diameter of the nozzle outlet of the nozzle.

5. The conformal printing device for curved-surface circuit according to claim 1, wherein surface roughness of the gas tube and the air outlet is less than a thickness of a surface boundary layer of the air outlet.

6. The conformal printing device for curved-surface circuit according to claim 1, wherein the print-head module further comprises a flow pump, an ink tank and an electrode ring;
  wherein the ink tank is disposed above the gas buffer chamber, the ink tank is connected to the nozzle via a liquid delivery tube and located above the nozzle for storing ink to be printed, the ink in the ink tank is steadily supplied to the nozzle via the liquid delivery tube by driving of the flow pump, the electrode ring is provided at a lower end of the structure body and coaxially provided with the air outlet.

7. The conformal printing device for curved-surface circuit according to claim 6, wherein the print-head module further comprises a high voltage power supply and a high voltage amplifier for applying a voltage to the ink in the ink tank and to the electrode ring, wherein the nozzle is connected to a first positive voltage, the electrode ring is connected to a second positive voltage, the curved-surface base material is connected to a negative voltage, and the first positive voltage is higher than the second positive voltage.

8. The conformal printing device for curved-surface circuit according to claim 7, wherein the high voltage power supply is used to generate an AC voltage, a voltage signal is amplified by the high voltage amplifier and then loaded between the nozzle and the curved-surface base material for achieving three printing modes of electro-dot ejecting, electro-eject coating and electrostatic spinning.

9. The conformal printing device for curved-surface circuit according to claim 6, wherein the conformal printing device is configured:

if only an electro-hydro-dynamic inkjet printing method is used, a voltage is applied to the ink in the ink tank and to the electrode ring, but air is not supplied to the airflow assisting structure; or if only an airflow focusing ejecting method is used, air is supplied into the airflow assisting structure, but the voltage is not applied to the ink in the ink tank and to the electrode ring.

10. The conformal printing device for curved-surface circuit according to claim 1, wherein the motion module comprises a first drive assembly, a second drive assembly and a third drive assembly for moving the worktable along a X-axis direction, a Y-axis direction and a Z-axis direction perpendicular to each other, respectively, and the motion module comprises a first rotating drive assembly for rotating the worktable about a first axis parallel to the Y-axis, and a second rotating drive assembly for driving the worktable about a second axis parallel to the Z-axis, and the third drive assembly further drives the print-head module to move along the Z-axis direction.

11. The conformal printing device for curved-surface circuit according to claim 1, wherein the conformal printing device further comprises a vision module comprising a positioning camera and an observation camera, the positioning camera is perpendicular to the curved-surface base material for positioning the nozzles with the curved-surface base material, and the observation camera is directed to the nozzles for real time observing whether the jet is a Taylor cone during printing.

12. The conformal printing device for curved-surface circuit according to claim 1, wherein the conformal printing device further comprises a curing and molding module comprising a laser sintering part disposed in the vicinity of the curved-surface base material to be printed, to irradiate a continuous laser or a pulsed laser to the ink ejected to the curved-surface base material.

* * * * *